(12) United States Patent
Boticki

(10) Patent No.: US 8,333,410 B2
(45) Date of Patent: Dec. 18, 2012

(54) MULTIPLE PORT SNAP SWIVEL COUPLING AND KIT

(75) Inventor: John A. Boticki, Racine, WI (US)

(73) Assignee: Fred Knapp Engraving Company, Inc., Racine, WI (US)

( * ) Notice: Subject to any disclaimer, the term of this patent is extended or adjusted under 35 U.S.C. 154(b) by 577 days.

(21) Appl. No.: 12/437,204

(22) Filed: May 7, 2009

(65) Prior Publication Data

US 2010/0284730 A1 Nov. 11, 2010

(51) Int. Cl.
*F16L 39/00* (2006.01)

(52) U.S. Cl. ............. 285/127.1; 285/130.1; 285/133.21; 285/133.3; 285/281; 285/147.1

(58) Field of Classification Search ............ 285/12, 285/127.1, 130.1, 131.1, 133.11, 133.21, 285/133.3, 275, 278, 280, 281, 308, 921, 285/121.1, 121.3, 121.6, 145.2, 147.1, 125.1
See application file for complete search history.

(56) References Cited

U.S. PATENT DOCUMENTS

| | | | |
|---|---|---|---|
| 2,273,396 A | 2/1942 | Couty | |
| 2,748,463 A | 6/1956 | Mueller | |
| 3,151,893 A | 10/1964 | Lyon | |
| 3,164,400 A | 1/1965 | Weaver | |
| 3,167,330 A | 1/1965 | Draudt | |
| 3,278,204 A | 10/1966 | Currie | |
| 3,540,223 A * | 11/1970 | Ebbe | 285/133.11 |
| 4,067,534 A | 1/1978 | Frey | |
| 4,152,017 A | 5/1979 | Abramson | |
| 4,214,586 A | 7/1980 | Mericle | |
| 4,474,392 A | 10/1984 | Vassallo et al. | |
| 4,558,889 A | 12/1985 | Gans | |
| 4,625,998 A | 12/1986 | Draudt et al. | |
| 4,679,827 A | 7/1987 | Law | |
| 4,787,655 A * | 11/1988 | Gross et al. | 285/127.1 |
| 4,852,563 A * | 8/1989 | Gross | 285/179 |
| 4,946,204 A * | 8/1990 | Boticki | 285/921 |

(Continued)

OTHER PUBLICATIONS

Value Plastics, Inc. "Precision Components Get Connected." Fort Collins, CO. Excerpts of catalog. 16 pages. Date: Copyright 2001.

(Continued)

*Primary Examiner* — David E Bochna
(74) *Attorney, Agent, or Firm* — Jansson Shupe & Munger Ltd.

(57) ABSTRACT

A multi-piece swivel coupling kit with a snap connection for ready and rapid assembly with the capability to be disassembled and reconfigured as required by the specific installation. The swivel coupling kit includes a tubular socket member having a line connecting end and multiple coupling ends and multiple tubular stem members each having a line connecting end and a coupling end connectable to one of the coupling ends of the tubular socket member. The multiple coupling ends including integral complementing annular projections and recesses which define a close fitting bearing unit creating forced engagement between the projections and recesses to establish smooth engagement and rotational support of the socket member and each of the stem members. The multiple coupling ends of the tubular socket member are configured to allow releasable configuration, reconfiguration and expansion of the multiple tubular stem members along a X axis, a Y axis and a Z axis and in a X plane, a Y plane and a Z plane. The multiple tubular socket members may be ganged together to further flexibly expand or reconfigure the swivel coupling kit.

20 Claims, 25 Drawing Sheets

U.S. PATENT DOCUMENTS

| | | | | |
|---|---|---|---|---|
| 4,971,366 A | * | 11/1990 | Towsley | 285/12 |
| 5,104,157 A | * | 4/1992 | Bahner | 285/921 |
| 5,217,260 A | | 6/1993 | Boticki | |
| 5,251,938 A | * | 10/1993 | Erickson | 285/92 |
| 5,261,447 A | | 11/1993 | Boticki | |
| 5,368,339 A | | 11/1994 | Serot | |
| 5,375,887 A | * | 12/1994 | Johnson | 285/12 |
| 5,405,174 A | | 4/1995 | Sonden et al. | |
| 5,678,592 A | | 10/1997 | Boticki et al. | |
| 5,695,223 A | | 12/1997 | Boticki | |
| 5,862,948 A | | 1/1999 | Duchon et al. | |
| 5,927,338 A | | 7/1999 | Boticki et al. | |
| 5,937,885 A | | 8/1999 | Sampson | |
| 5,954,240 A | | 9/1999 | Duchon et al. | |
| 6,058,975 A | * | 5/2000 | Hui-Chen | 285/125.1 |
| 6,098,651 A | | 8/2000 | Boticki et al. | |
| 6,129,125 A | | 10/2000 | Duchon et al. | |
| 6,196,256 B1 | * | 3/2001 | Klampfer | 285/133.11 |
| 6,202,717 B1 | | 3/2001 | Markey et al. | |
| 6,279,598 B1 | | 8/2001 | Boticki et al. | |
| 6,378,789 B1 | | 4/2002 | Seaman, Jr. et al. | |
| 6,438,895 B1 | * | 8/2002 | Fortier | 285/133.11 |
| 6,446,880 B1 | | 9/2002 | Schram et al. | |
| 6,505,866 B1 | * | 1/2003 | Nakamura et al. | 285/423 |
| 6,547,159 B1 | * | 4/2003 | Westby | 285/148.23 |
| 6,568,713 B1 | * | 5/2003 | Bruvry et al. | 285/133.21 |
| 6,708,901 B2 | | 3/2004 | Hubmann et al. | |
| 6,786,427 B2 | | 9/2004 | Schram et al. | |
| 6,843,430 B2 | | 1/2005 | Boticki et al. | |
| 6,860,295 B2 | * | 3/2005 | Lohr et al. | 137/893 |
| 7,025,289 B2 | | 4/2006 | Humann et al. | |
| 7,086,610 B2 | | 8/2006 | Hubmann et al. | |
| 7,100,843 B2 | | 9/2006 | Boticki et al. | |
| 7,152,626 B1 | | 12/2006 | Lang et al. | |
| D567,084 S | | 4/2008 | Batton et al. | |
| D582,767 S | | 12/2008 | Batton et al. | |
| 7,874,595 B2 | * | 1/2011 | Lechner et al. | 285/305 |

OTHER PUBLICATIONS

Colder Products Company. "Breakaway Series Specifications." St. Paul, MN. 2 pages. Date: Copyright 2008.

\* cited by examiner

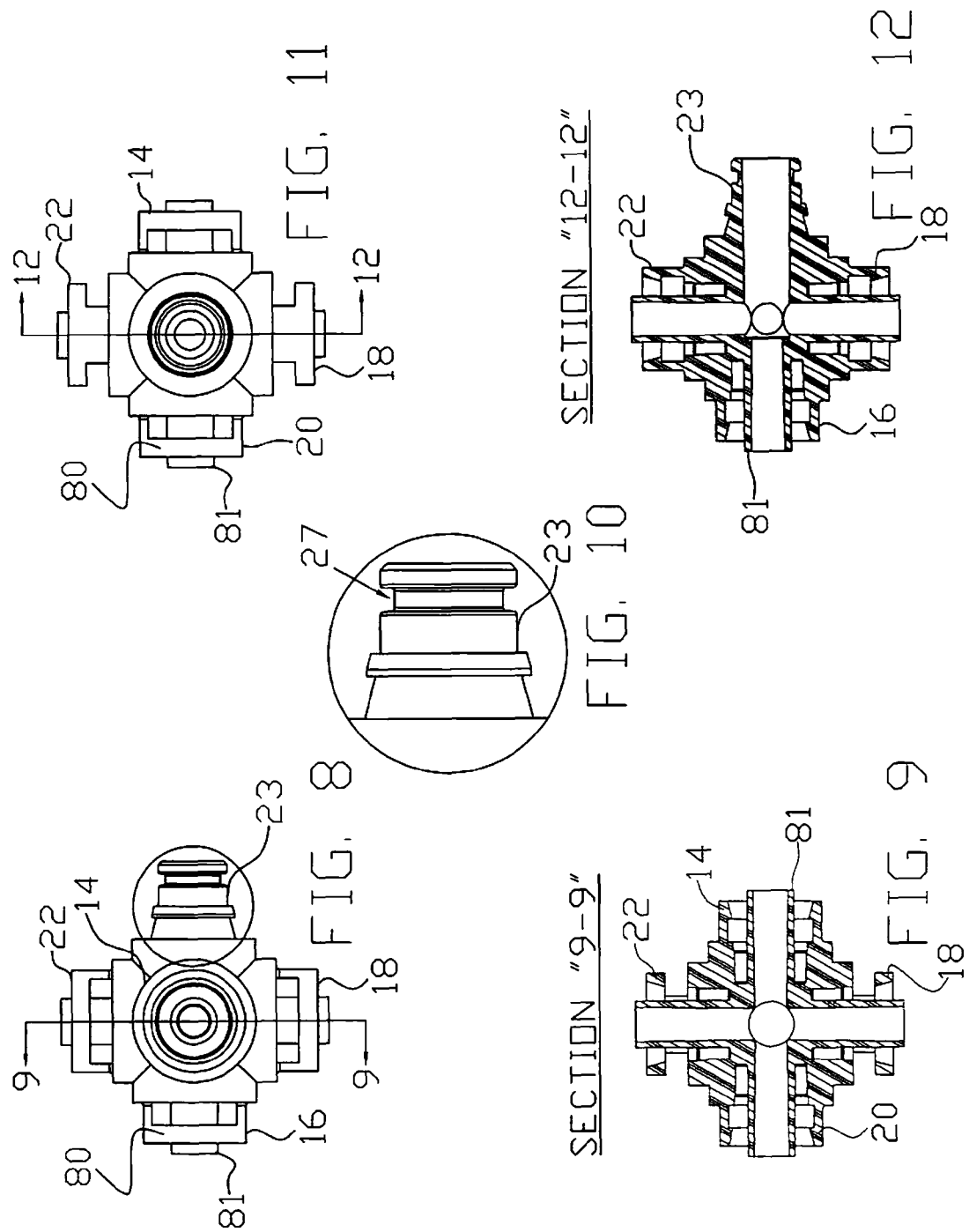

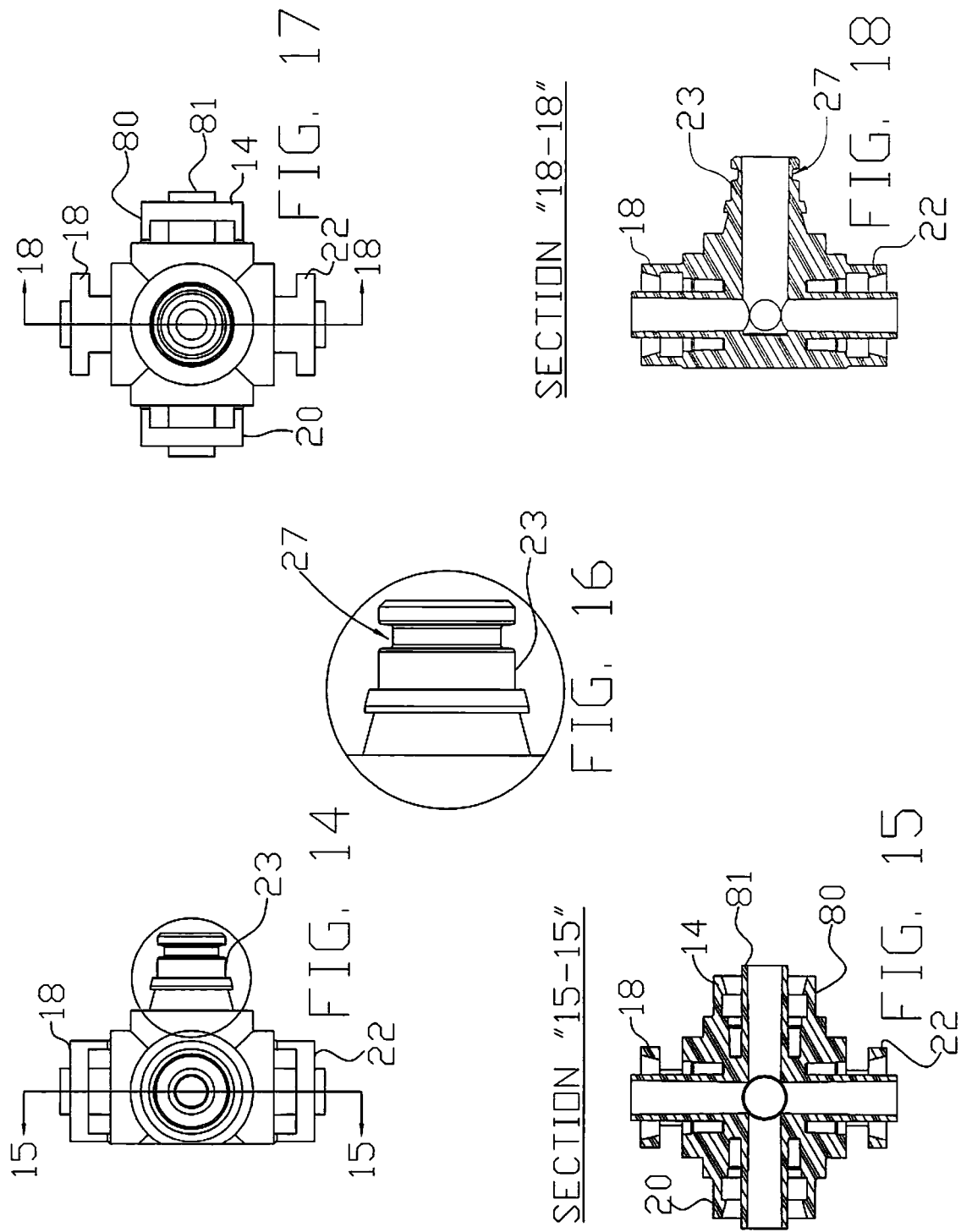

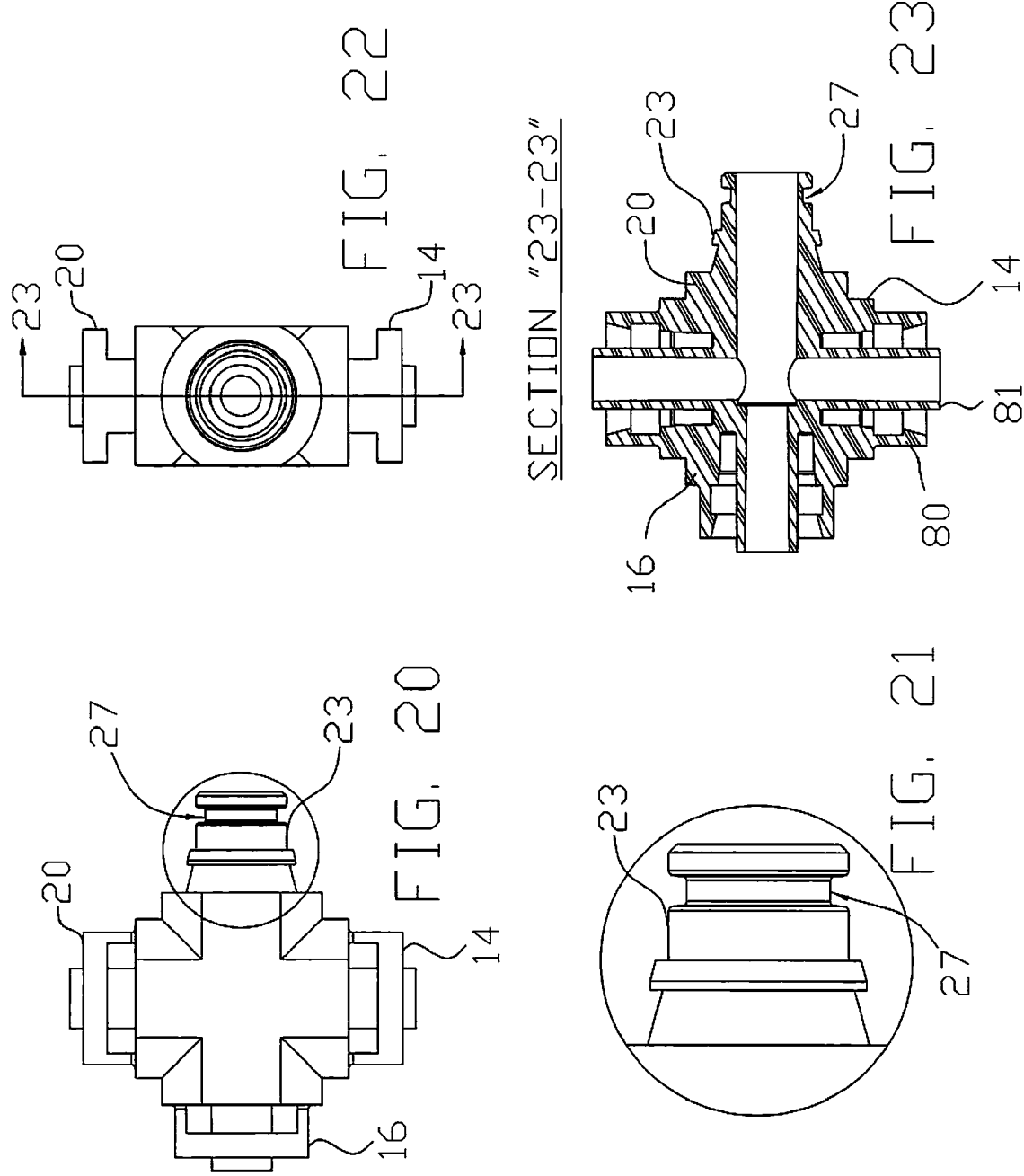

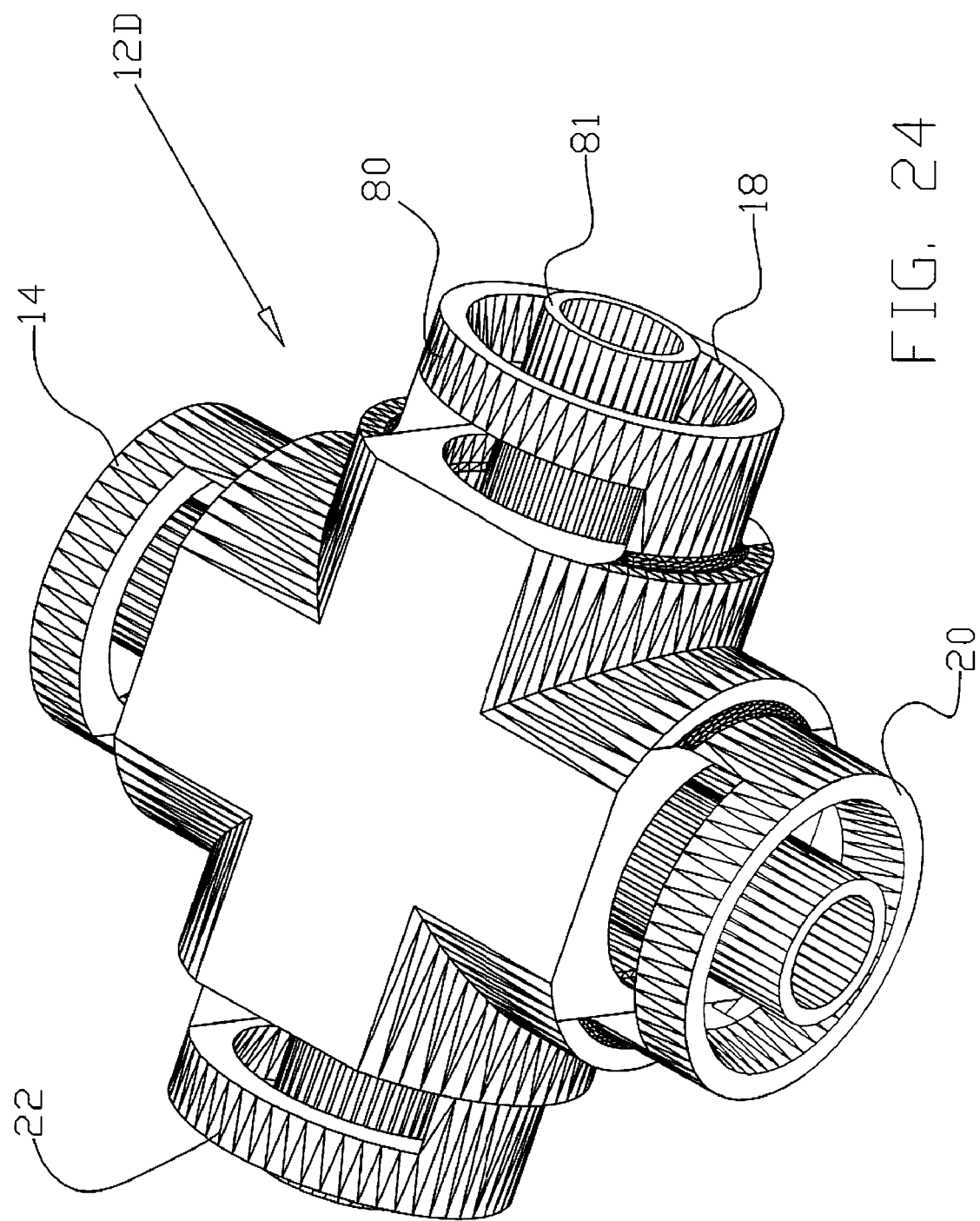

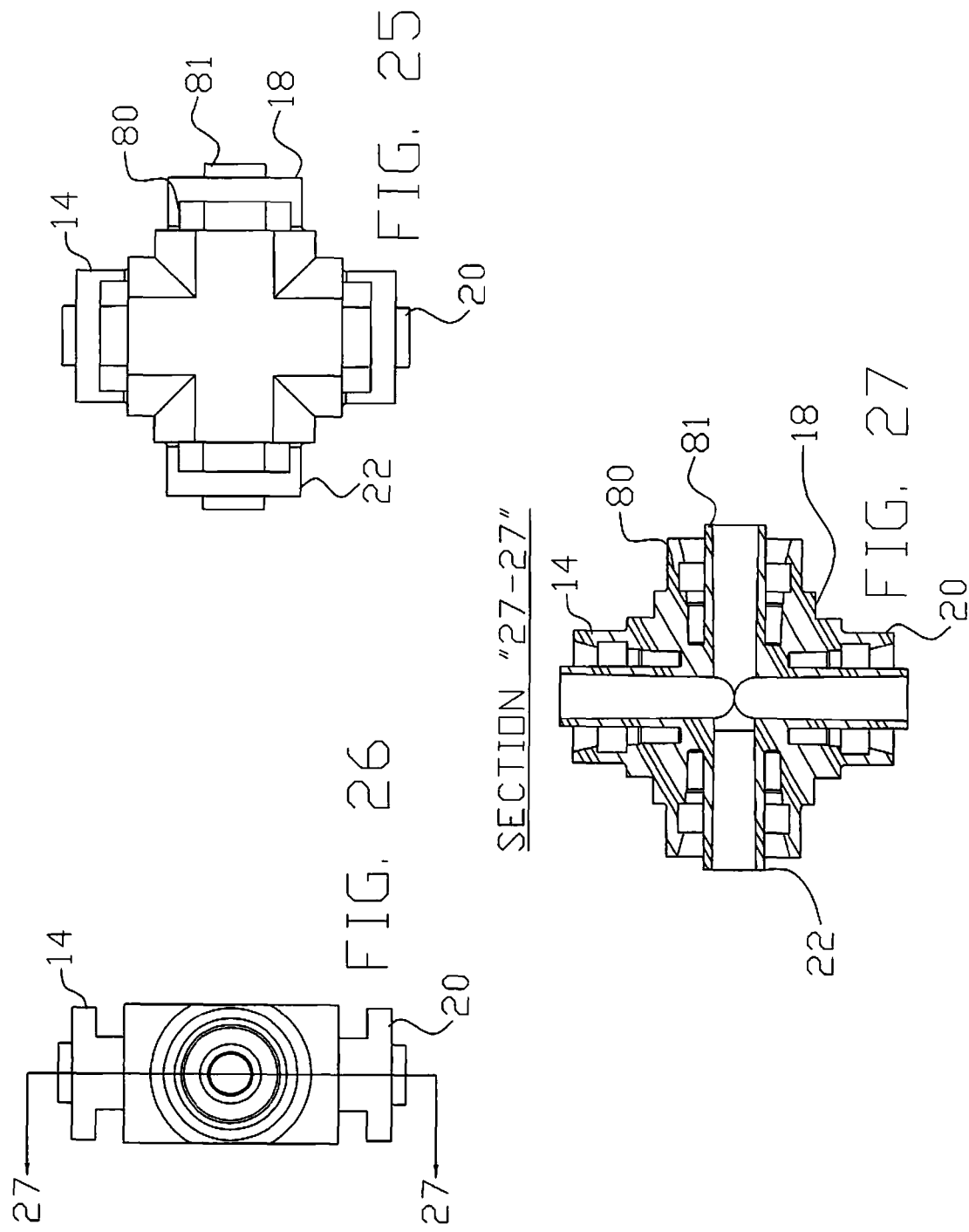

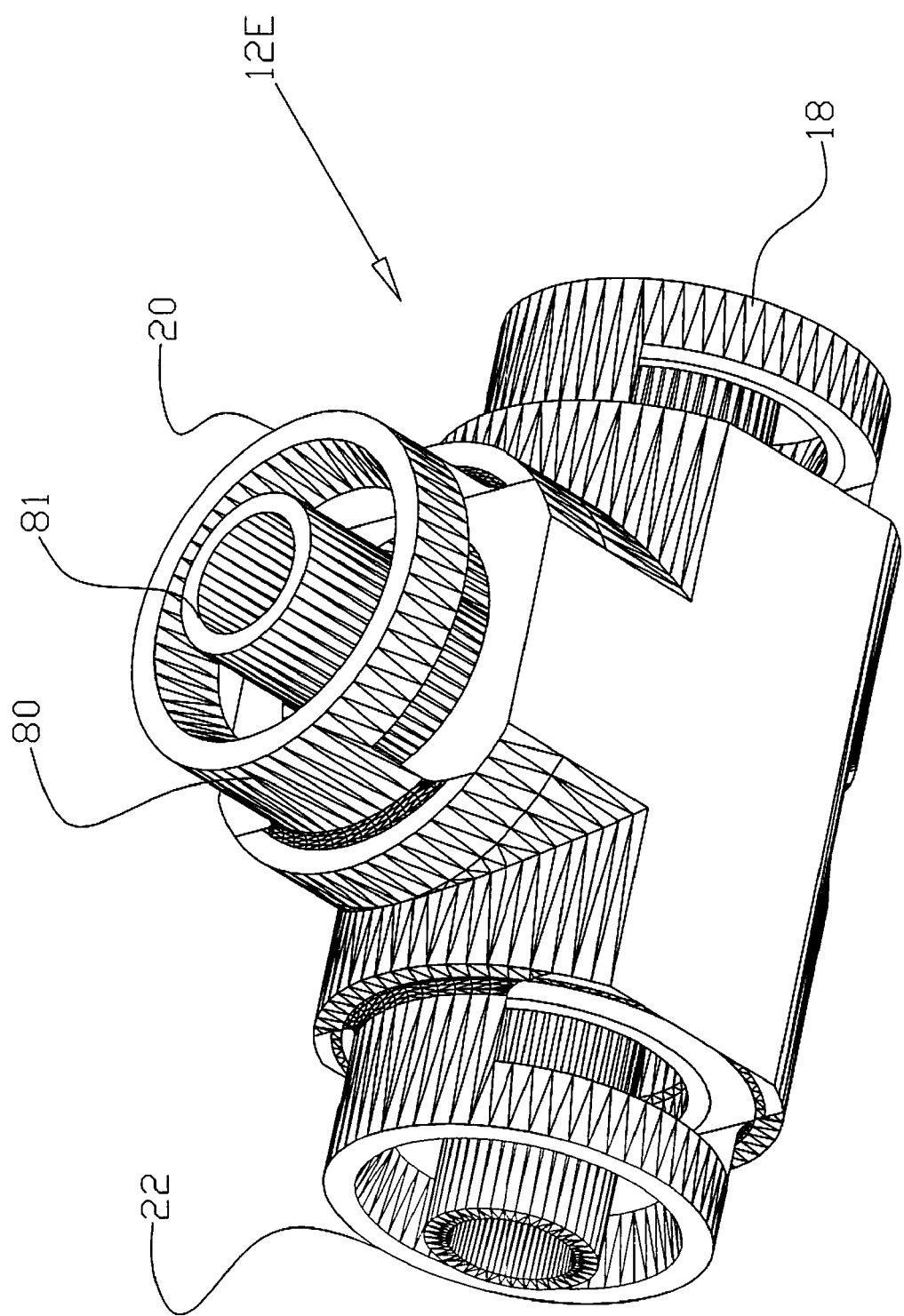

SECTION "31-31"

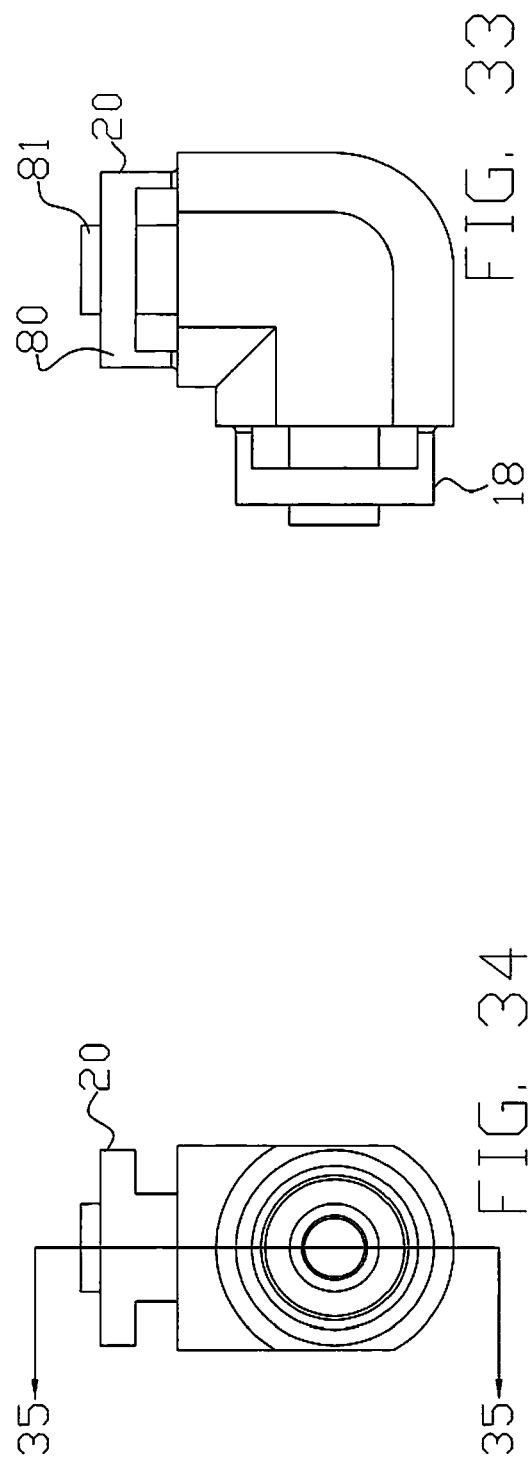

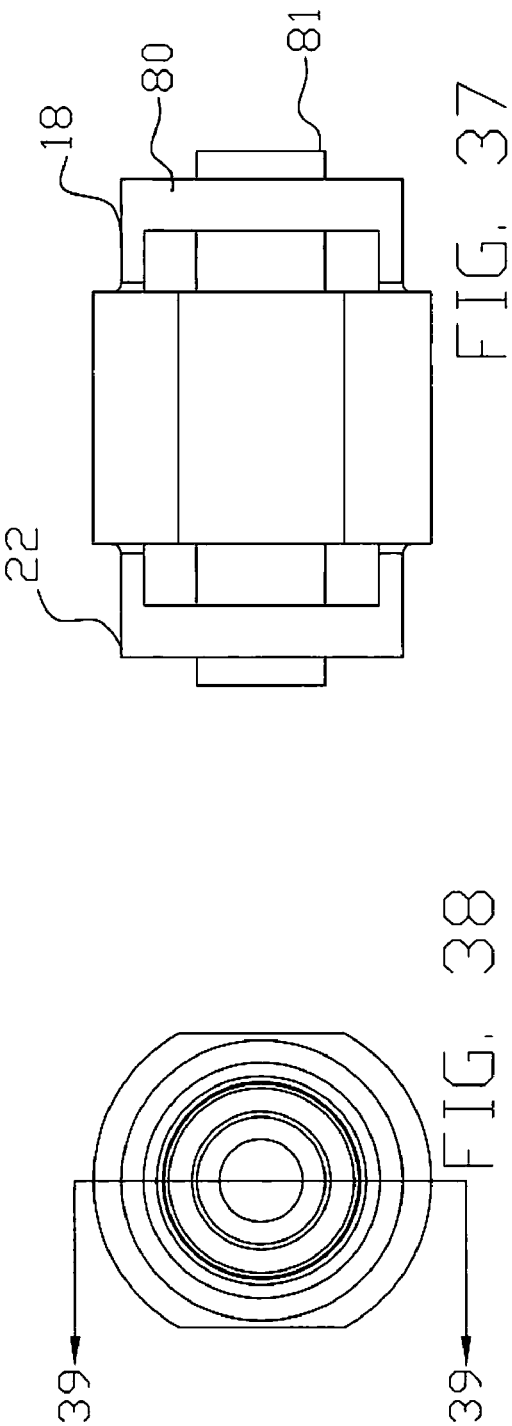

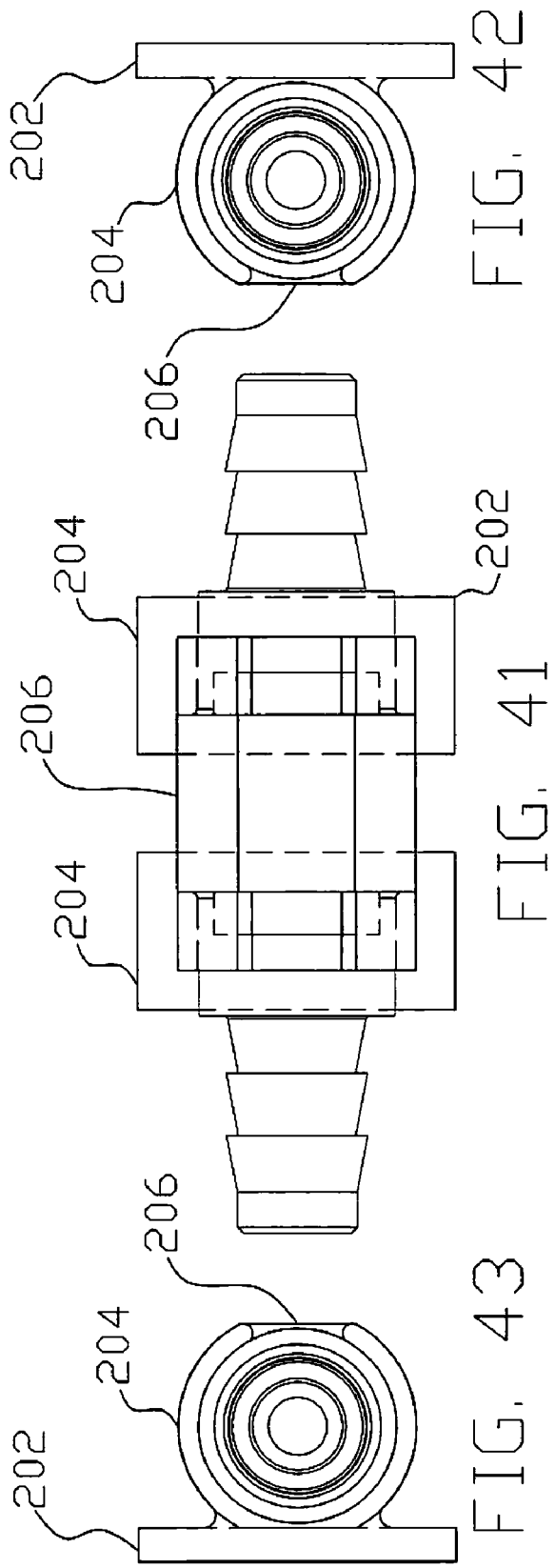

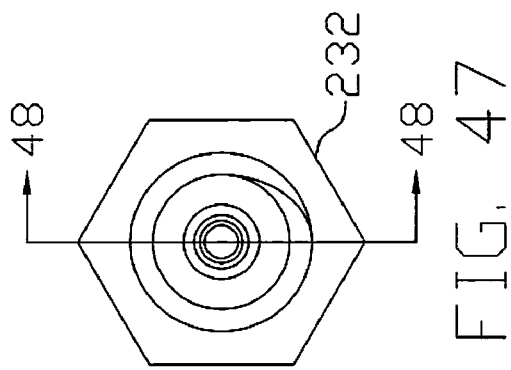
FIG. 47
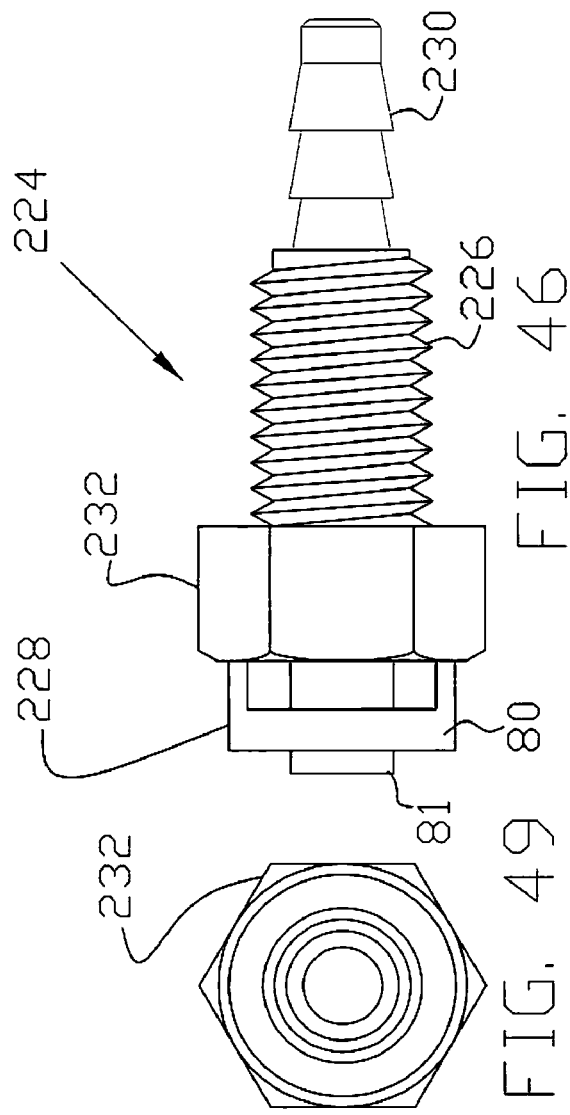
FIG. 46
FIG. 49
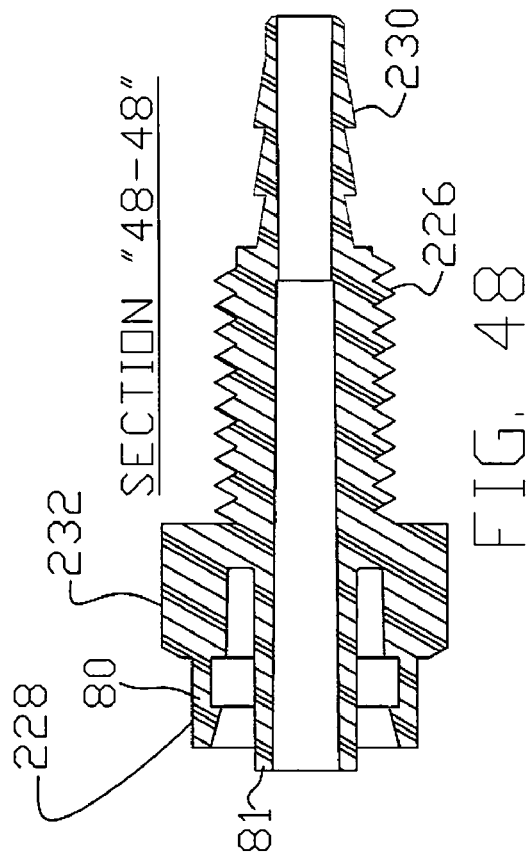
SECTION "48-48"
FIG. 48

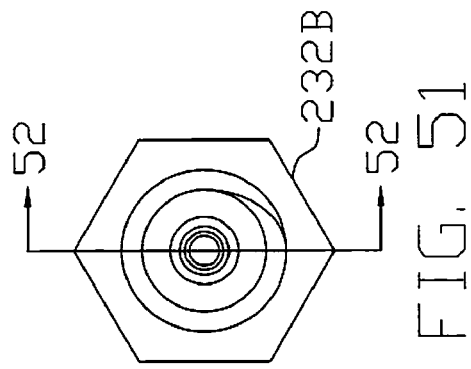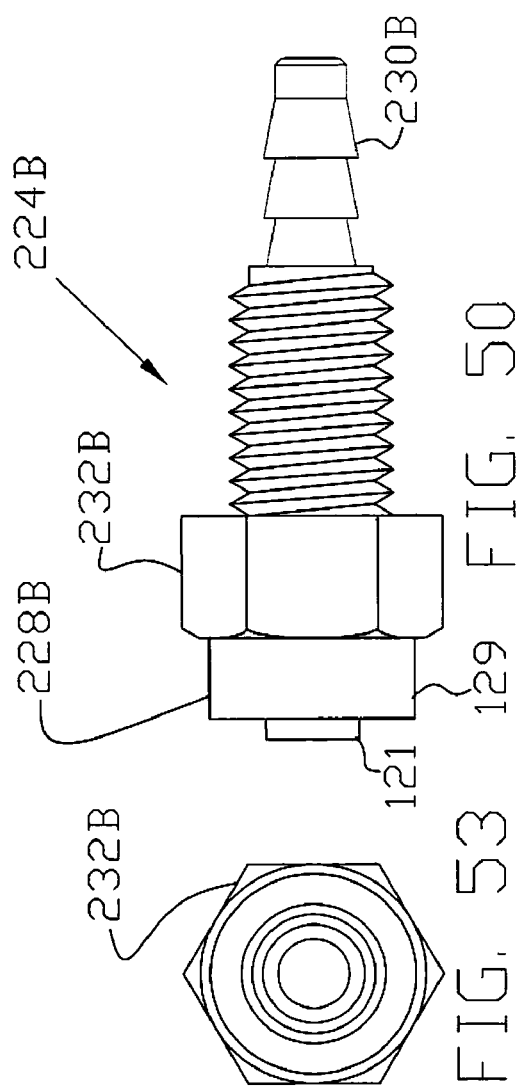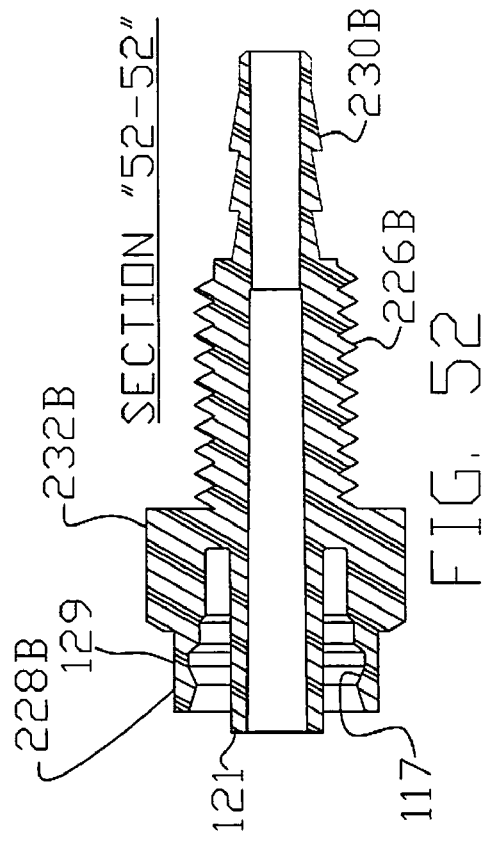

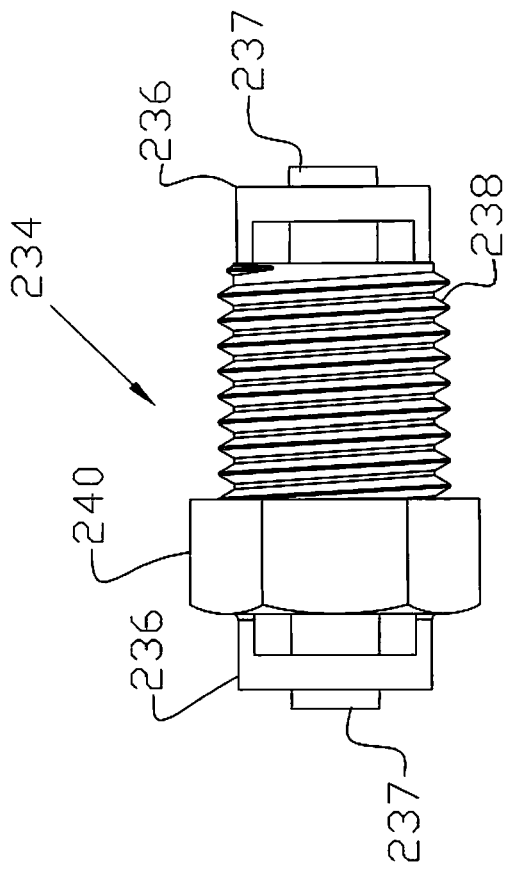
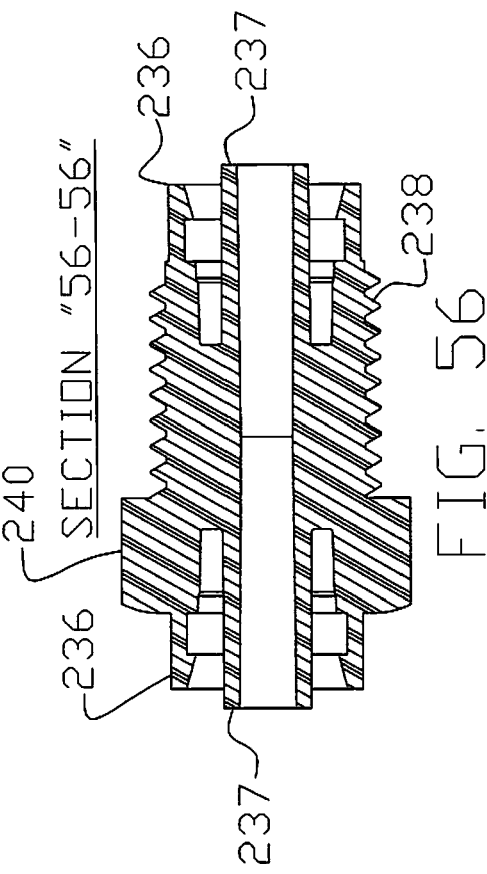
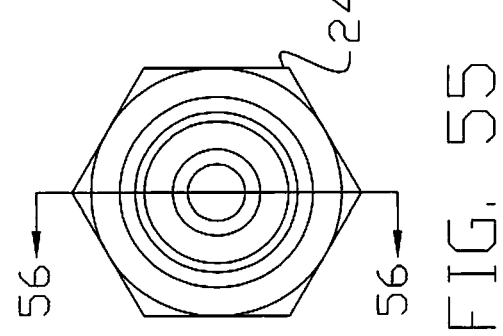
FIG. 54
FIG. 56
FIG. 55

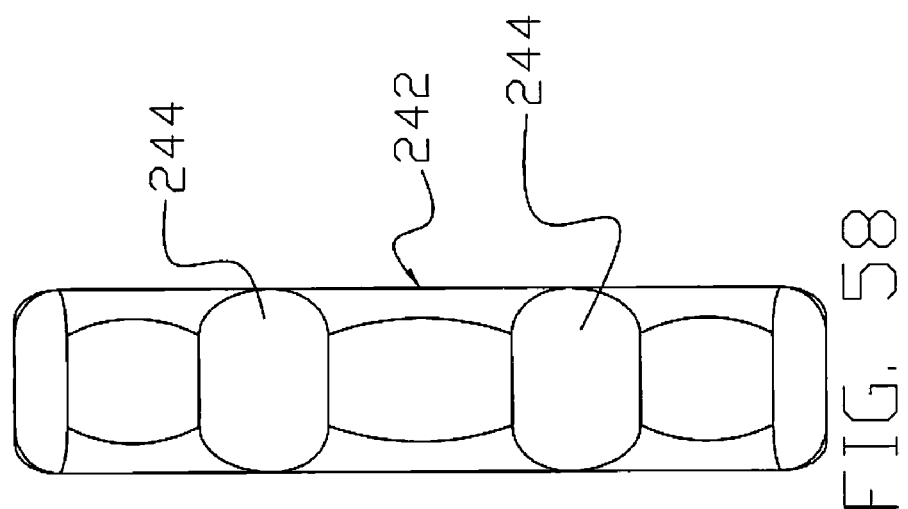
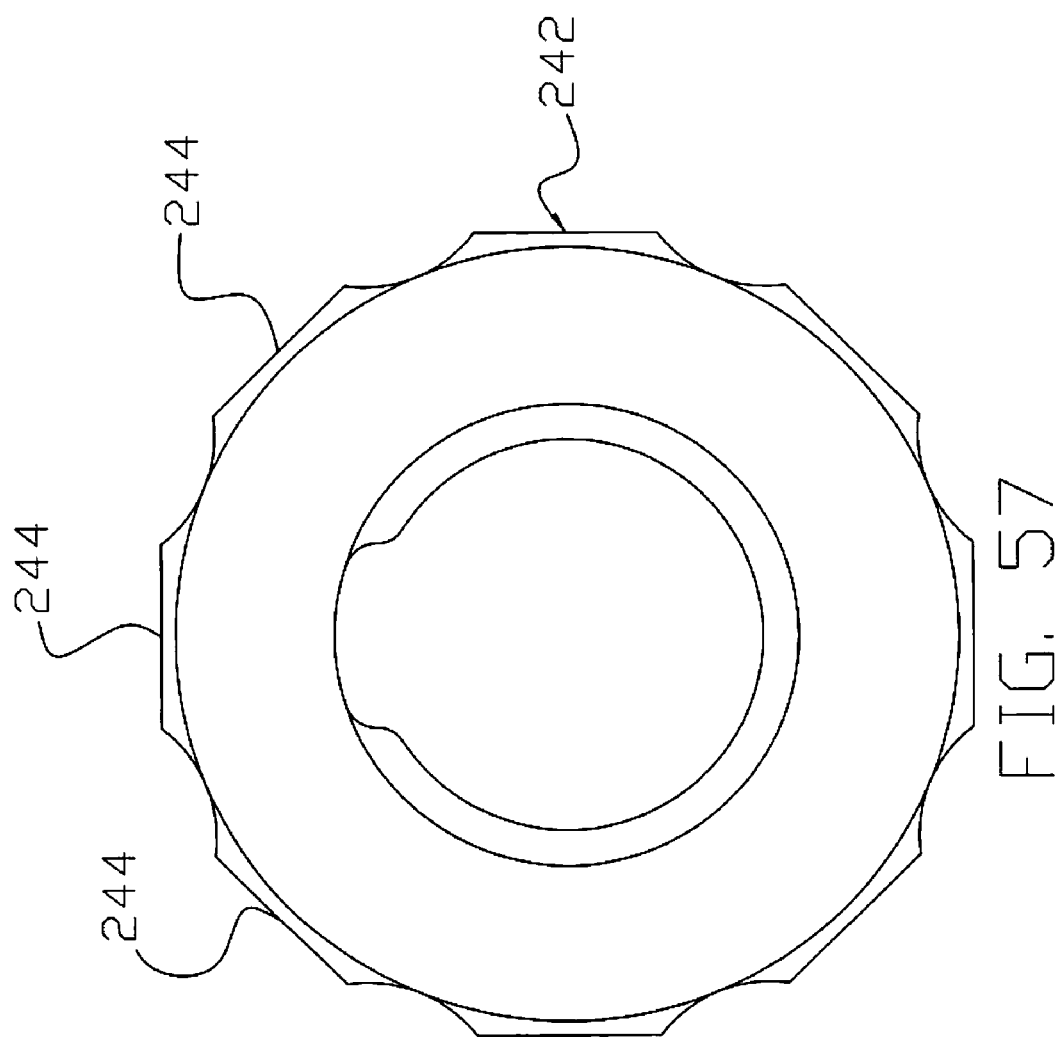

MULTIPLE PORT SNAP SWIVEL COUPLING AND KIT

FIELD OF THE INVENTION

This invention relates to a snap swivel coupling for fluid flow applications and particularly to multiple port snap couplings and kits to provide expandability, configurability and maintainability of pneumatic and other pressurized control and operating systems.

BACKGROUND OF THE INVENTION

In various fluid control and operating systems, relatively small pneumatic lines are required for transmitting control and operating fluid pressure and flow signals. The connection, mounting, positioning and running of lines in and through various channel and protected areas requires the use of individual connectors for interconnecting of multiple lines. Intersecting paths may require special shaped couplings. Swivel couplings are also used for convenience of assembly with a minimum number of different designed couplings.

U.S. Pat. No. 4,946,204 to Boticki, which is commonly assigned to the Assignee of the present application, discloses a snap swivel coupling for fluid flow applications. The snap swivel coupling includes a 90 degree swivel coupling formed from plastic resin having one socket member and one stem member for telescoping locking and sealing assembly. While this construction forms a highly desirable snap fit locking and scaling coupling, it is desirable to have other snap swivel components and configurations for various uses. It is also desirable to provide for releasable and reconfigurabie assembly of the snap swivel components and to provide a selection of various configurations of snap swivel components in kit form allowing the kit and associated pneumatic lines to be expanded in various directions along a X axis, a Y axis and a Z axis and in an X plane, a Y plane and a Z plane.

Other swivel couplings are also disclosed in the prior art. These couplings do not include kit configurability, simple connectors in combination or the ability to gang multiple port connectors together to expand, reconfigure or maintain pneumatic and other pressurized control or operating systems.

Notwithstanding the many different designs for swivel couplings in fluid flow systems, there remains a need and demand for a highly reliable swivel coupling kit and multi-port connectors which may be ganged together. In addition, there is a continuing need for multiple piece or multi-piece connector kits with multiple port connections which may be ganged together providing flexibility, ease of connection, case of use, ease of reuse and maintenance, linear and non-linear configuration, expansion, extension, stacking and re-configuration, a maximum number of connectable and interchangeable components, and low cost production capability. Further, such multi-piece connector kits with gangable multiple port connectors which provide ease of snap fit assembly, modularity and the capability for easy disassembly are also desirable for in-field applications and prototype development. In addition, it is desirable for multiple port connectors and kits to have 360 degree on axis rotation of component connectors and parts.

SUMMARY OF THE INVENTION

The present invention is particularly directed to a multi-piece swivel coupling kit with a snap connection for ready and rapid assembly with the capability to be disassembled as required by the specific installation. Generally, in accordance with the teaching of the present invention, the swivel coupling kit includes a tubular socket member having a line connecting end and multiple coupling ends. The snap swivel coupling kit also includes multiple tubular stem members each having a line connecting end and a coupling end connectable to one of the coupling ends of the tubular socket member. The multiple coupling ends include integral complementing annular projections and recesses which define a close fitting bearing unit creating forced engagement between the projections and recesses to establish smooth rotational support of the socket member and each of the stem members.

More particularly the multiple coupling ends of the tubular socket member are designed to allow configuration of the multiple tubular stem members in a X plane and a Y plane. The multiple coupling ends of the tubular socket member may be arranged to allow configuration of the multiple tubular stem members in a X plane, Y plane and Z plane and to allow expansion of the multiple tubular stem members in at least one of a X axis, a Y axis and a Z axis, and a X plane, a Y plane and a Z plane. The multiple tubular stem members may be releasably connectable to one of the coupling ends of the tubular socket member. In addition, the multiple tubular socket members may be ganged together enhancing modularity and to further flexibly configure, expand, disassemble or reconfigure the snap swivel coupling kit.

In a preferred construction of the present invention, the multi-piece snap swivel coupling kit may include one or more of a nipple tubular stem member, a "L" shaped tubular stem member; a "T" shaped tubular stem member, a "Y" shaped tubular stem member, a shaped tubular stem member, a "X" shaped tubular stem member, a cap member, a "L" shaped tubular socket member, a "T" shaped tubular socket member; a "+" shaped tubular socket member, a "Y" shaped tubular socket member; a "X" shaped tubular socket member, a feed through tubular connector with two male ends, a feed through tubular connector with two female ends and a feed through tubular connector having a male end and a female end. In another preferred embodiment, the multi-piece snap swivel coupling kit of the present invention includes multiple tubular stem members having an outer surface which may be connected to a mounting structure. Specifically, the multiple tubular stem members include a threaded outer surface which may be mounted through a mounting structure, such as a plate, wall or other mounting surface. The swivel coupling kit may also include a clip which may be positioned on the mounting structure for holding the tubular socket member or one or more of the tubular stem members.

In yet another preferred embodiment, the multiple coupling ends of the tubular socket member each include a cantilevered continuous annular skin including a complementing portion of the projection and recess portions. The multiple coupling ends each have circumferentially spaced openings adjacent to the projection and recess portions to permit deflection thereof during connection of the annular skirl of the tubular socket member with one of the tubular stem members. The continuous peripheral annular bearing surfaces may be inclined at a shallow angle from a constant diameter cylinder plane having an axis coincident with the axis of the multiple tubular stem members. The multiple tubular stem members may also include a recess portion having a cam surface parallel to the continuous peripheral annular bearing surfaces, adjacent the longitudinal end of the recess and engaging the projection portion during connection of the tubular socket member with one of the tubular stem members to deflect the projection portion. Such engagement may be telescopic engagement or connection. Further, the shallow angle may be approximately fifteen degrees.

In yet another preferred embodiment, the snap swivel coupling kit includes integral complementing annular projection and recess portions which provide releasable connection of the socket member and each of the stem members. The releasable connection of the socket member and each of the stem members allows reconfiguration of the socket member and each of the stem members.

In another preferred embodiment, the swivel coupling kit includes a separate seal unit located between each of the stem members and the multiple coupling ends of the tubular socket member. The multiple coupling ends of the tubular socket member each include an inner support tube member extended into each of the stem members, the seal unit being located inwardly of the continuous peripheral annular bearing surfaces between an outer side of the stem members and the adjacent coupling end of the socket member. The swivel coupling kit may include a cylindrical mating chamber in each of the multiple coupling ends of the tubular socket member and a projecting wall in each of the stem members. The cylindrical mating chamber may include a tubular wall projecting upwardly through each of the multiple coupling ends located in close spaced relation to each of the stem members.

In yet another preferred embodiment, a multiple port or multi-port snap swivel coupling is provided which includes multiple socket members each adapted to connect with a stem member having an internal bearing recess with an inclined bearing wall. Each of the multiple socket members has an outer annular skirl portion including a continuous and uninterrupted bearing projection complementing and mating with said internal bearing recess to establish a swivel coupling. Each of the multiple socket members define a planar radial face abutting the inclined bearing wall of the internal bearing recess of the stem member. The outer annular skirt portion of each socket member may be expandable outwardly, having a stressed state with the bearing wall of a diameter slightly less than said bearing wall of the recess forcibly engaging bearing walls.

The stem member of the multi-port snap swivel coupling may include a cam projection extending longitudinal from the bearing recess with the cam projection having an inclined bearing wall with a maximum diameter slightly greater than the uninterrupted bearing projection of each socket member. The cam projection may have a maximum diameter less than the aligned diameter of said socket member for improved engagement thereof.

Each of the socket members of the multi-port snap swivel coupling may include an inner cylindrical chamber and the stem member may include an inner cylindrical end located in close spaced relation within the chamber of said socket member. A pressure seal unit may be located between the cylindrical sections. Further, the socket members may include a first annular receiving recess and a second annular receiving recess. The first annular receiving recess may have a diameter larger than the second annular receiving recess, such that as the stem member connects to one of the socket members, the pressure seal unit moves past the first annular recess then moves into the second annular recess.

In a preferred embodiment, the multiple socket members of the multi-port snap swivel coupling may be configured to allow ganging of multiple multi-port snap swivel couplings along a X axis, a Y axis, and in a X plane and a Y plane. In an alternative ganging of multiple multi-port snap swivel couplings can occur along a X axis, a Y axis, and a Z axis, and in a X plane, a Y plane and a Z plane. Another preferred embodiment provides for ganging and connection of multiple multiport snap swivel couplings. In addition, these couplings can be configured to provide releasable connection thereof to one another.

The present invention thus provides a simple multi-piece snap swivel coupling kit that is expandable, reconfigurable and easily maintained. The kit and the multiple port couplings are readily mass produced using present day technology and materials, and thus produce a commercially cost efficient coupling kit and multiple port coupling for fluid control and operating systems. Such kits and multiple port snap swivel connectors provide unlimited combinations, improved rapid design and development applications, lower cost, just-in-time delivery capabilities and rapid field service, repair, re-design, configuration, expansion and re-configuration options.

BRIEF DESCRIPTION OF THE DRAWINGS

The drawings generally illustrate the best mode and preferred embodiments presently contemplated for the invention and is described hereinafter.

FIG. 8 is a side elevational view of the connector of FIG. 7;

FIG. 9 is a vertical section take generally on line 9-9 of FIG. 5;

FIG. 10 is an enlarged detail of the male connection shown in FIG. 8;

FIG. 11 is a top elevational view of the connector of FIG. 7;

FIG. 12 is a vertical section take generally on line 12-12 of FIG. 11;

FIG. 14 is a side elevational view of the connector of FIG. 13;

FIG. 15 is a vertical section take generally on line 15-15 of FIG. 14;

FIG. 16 is an enlarged detail of the male connection shown in FIG. 13;

FIG. 17 is a top elevational view of the connector of FIG. 13;

FIG. 18 is a vertical section take generally on line 18-18 of FIG. 17;

FIG. 20 is a top elevational view of the connector of FIG. 19;

FIG. 21 is an enlarged detail of the male connection shown in FIG. 20;

FIG. 22 is a side elevational view of the connector of FIG. 20;

FIG. 23 is a vertical section take generally on line 23-23 or FIG. 22;

FIG. 24 is a three dimensional perspective view of a "+" multiple port snap swivel coupling connector constructed in accordance with another embodiment of the present invention providing connection and expansion along a X axis and a Y axis, and in a X plane and a Y plane;

FIG. 25 is a top elevational view of the connector of FIG. 24;

FIG. 26 is a side elevational view of the connector of FIG. 24;

FIG. 27 is a vertical section take generally on line 27-27 of FIG. 26;

FIG. 28 is a three dimensional perspective view of a "T" multiple port snap swivel coupling connector constructed in accordance with another embodiment of the present invention providing connection and expansion along a X axis and a Y axis, and in a X plane and a Y plane;

FIG. 33 is a top elevational view of the connector of FIG. 32;

FIG. 34 is a side elevational view of the connector of FIG. 32;

FIG. 35 is a vertical section take generally on line 35-35 of FIG. 34;

FIG. 37 is a top elevational view of the connector of FIG. 36;

FIG. 38 is a side elevational view of the connector of FIG. 36;

FIG. 39 is a vertical section take generally on line 39-39 of FIG. 38;

FIG. 40 is a side view of one embodiment of a clip for holding the snap swivel coupling connectors of the present invention;

FIG. 41 is a top elevational view of an "I" feed through multiple port snap swivel coupling connector being held by two clips;

FIG. 42 is a left side elevational view of the connector of FIG. 41;

FIG. 43 is a right side elevational view of the connector of FIG. 41;

FIG. 46 is a top elevational view of a bulkhead feed through multi-port snap swivel coupling connector constructed in accordance with another embodiment of the present invention;

FIG. 47 is a right side elevational view of the connector of FIG. 46;

FIG. 48 is a vertical section lake generally on line 48-48 of FIG. 47;

FIG. 49 is a left side elevational view of the connector of FIG. 46;

FIG. 50 is a top elevational view of a bulkhead feed through multi-port removable snap swivel coupling connector constructed in accordance with another embodiment of the present invention;

FIG. 51 is a right side elevational view of the connector of FIG. 50;

FIG. 52 is a vertical section take generally on line 52-52 of FIG. 51;

FIG. 53 is a left side elevational view of the connector of FIG. 50;

FIG. 54 is a top elevational view of a bulkhead feed through multi-port snap swivel coupling connector constructed in accordance with another embodiment of the present invention;

FIG. 55 is a right side elevational view of the connector of FIG. 54;

FIG. 56 is a vertical section take generally on line 56-56 of FIG. 55;

FIG. 57 is a top elevational view of a bulkhead nut for securing a feed through multi-port snap swivel coupling connector constructed in accordance with another embodiment of the present invention; and FIG. 58 is a right side elevational view of the bulkhead nut of FIG. 57.

DETAILED DESCRIPTION OF PREFERRED EMBODIMENTS

Figure 1:
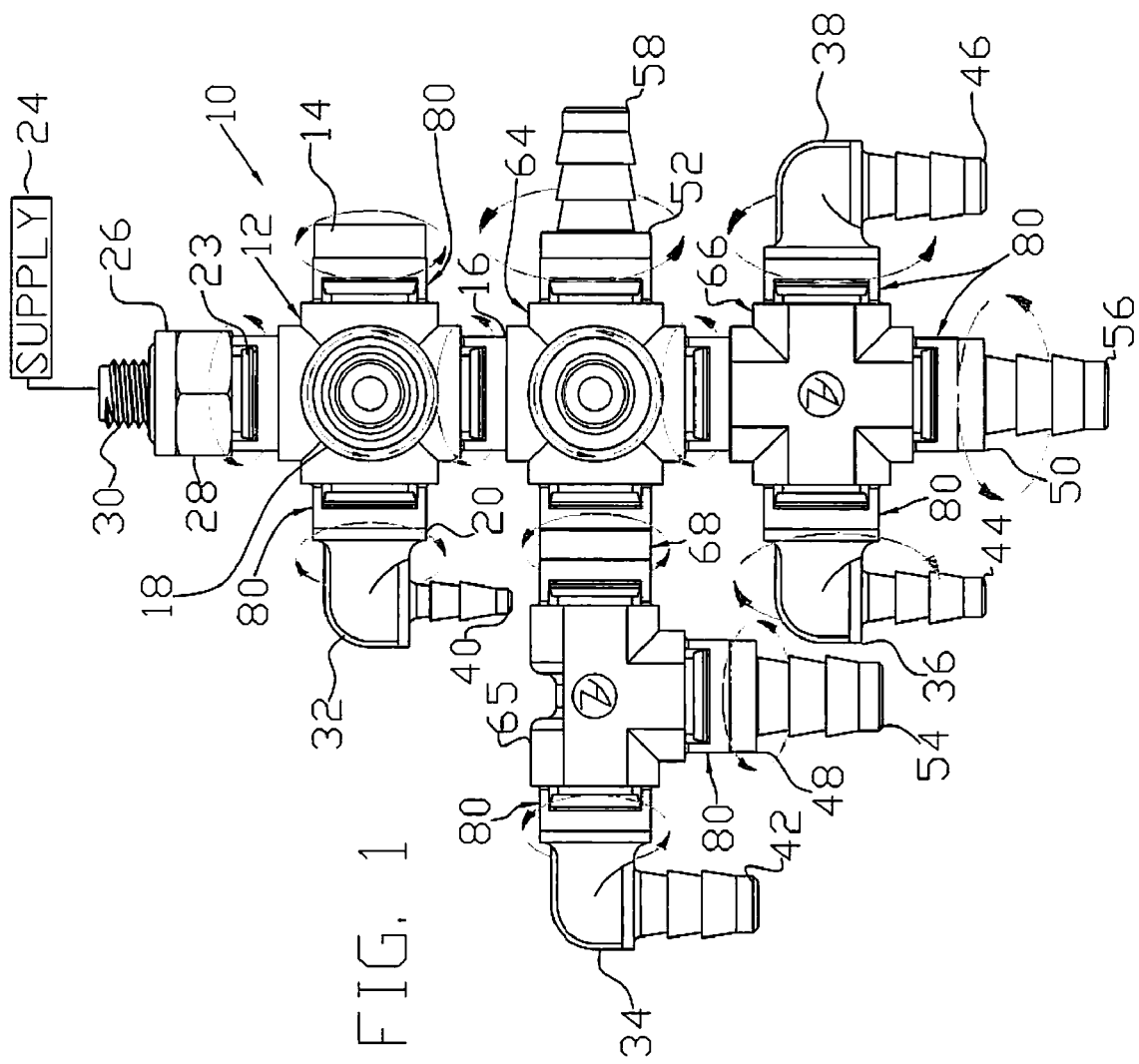
FIG. 1 is a top elevational view of one embodiment of the multi-piece snap swivel coupling kit constructed in accordance with the teaching of the present invention.
Figure 2:
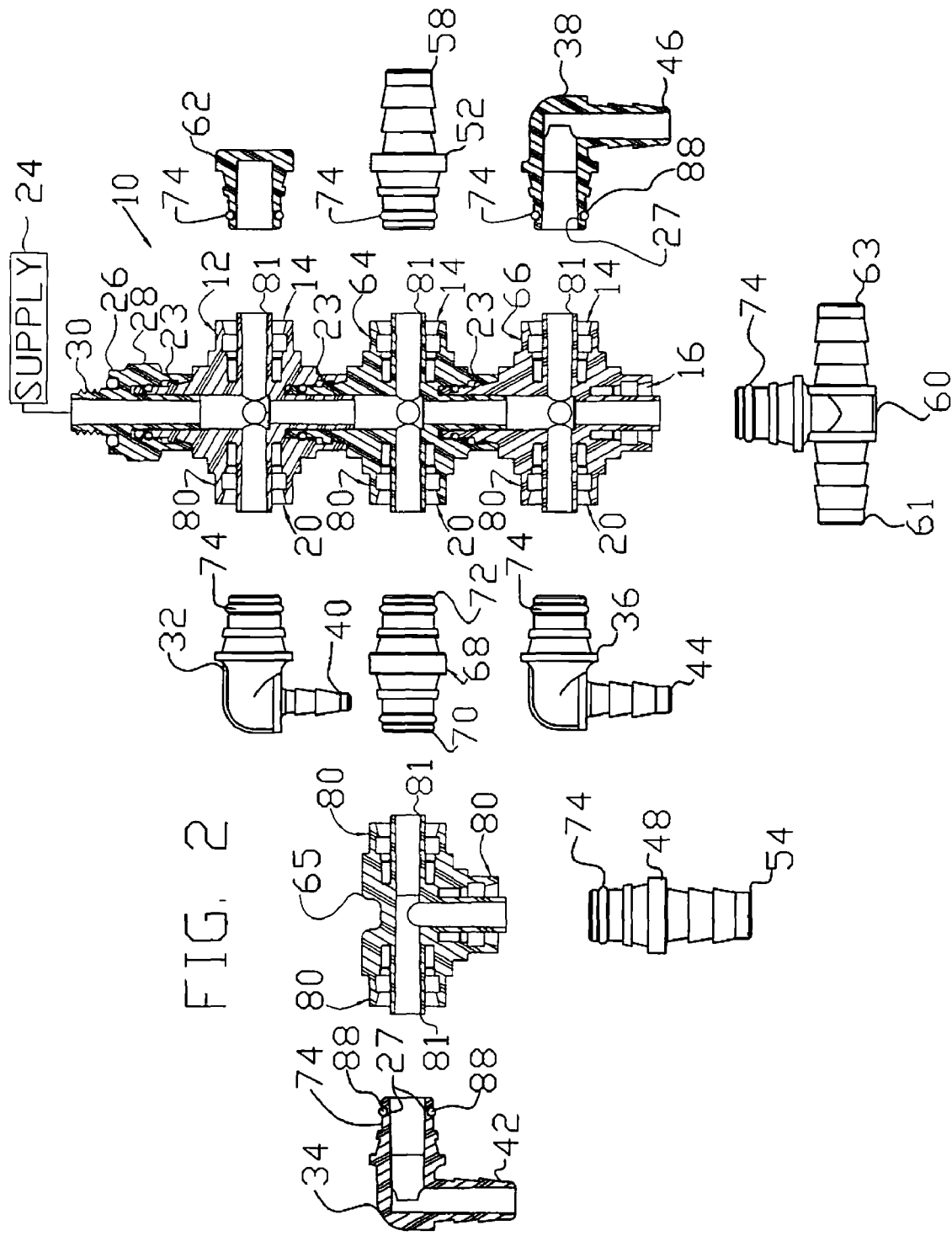
FIG. 2 is an exploded, partial sectional, of a multi-piece snap swivel coupling kit similar to the kit shown in FIG. 1.
Figure 7:
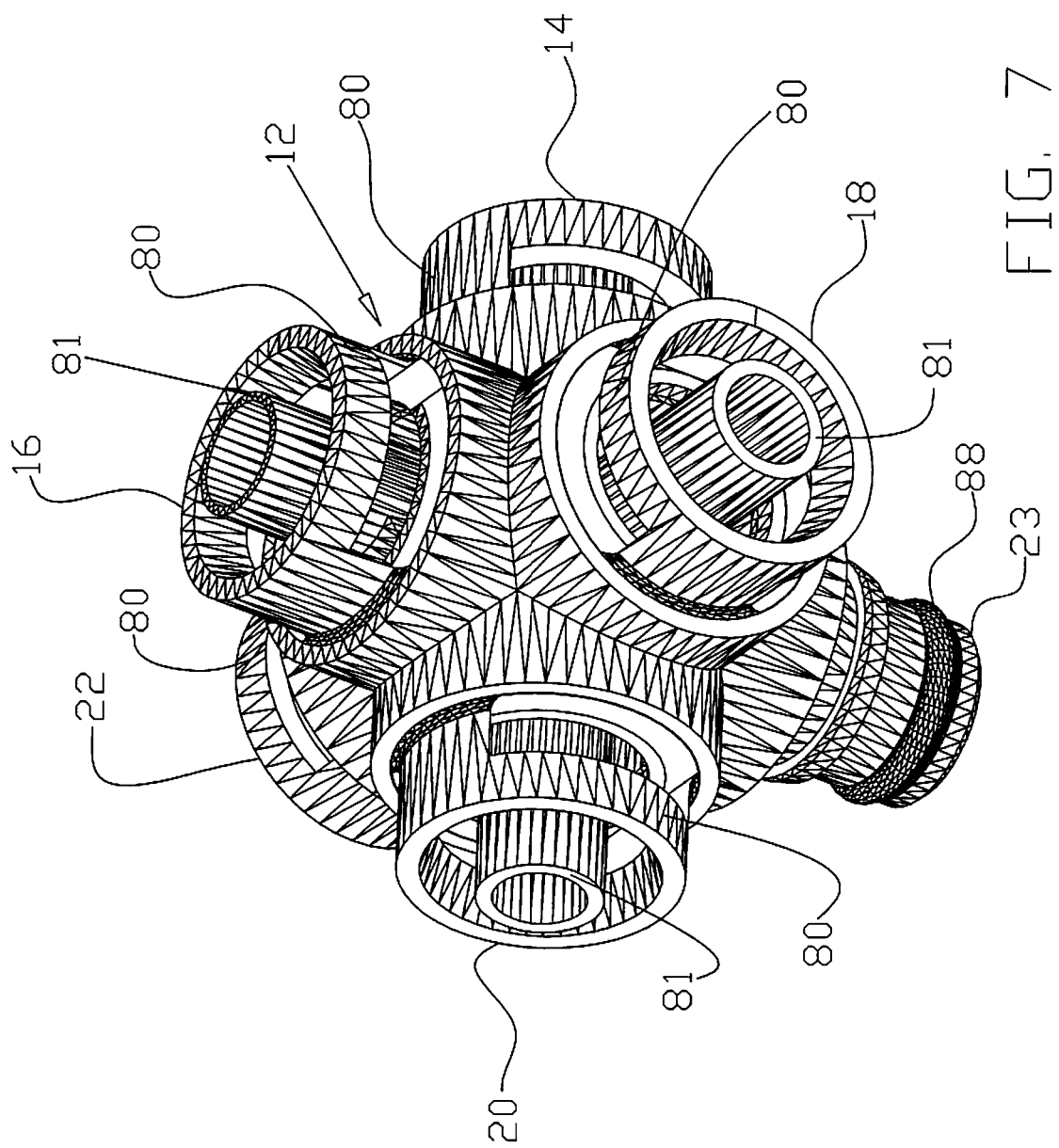
FIG. 7 is a three dimensional perspective view of a multiple port snap swivel coupling connector constructed in accordance with the present invention providing connection and expansion along a X axis, a Y axis and a Z axis, and in a X plane, a Y plane and a Z plane.
Figure 13:
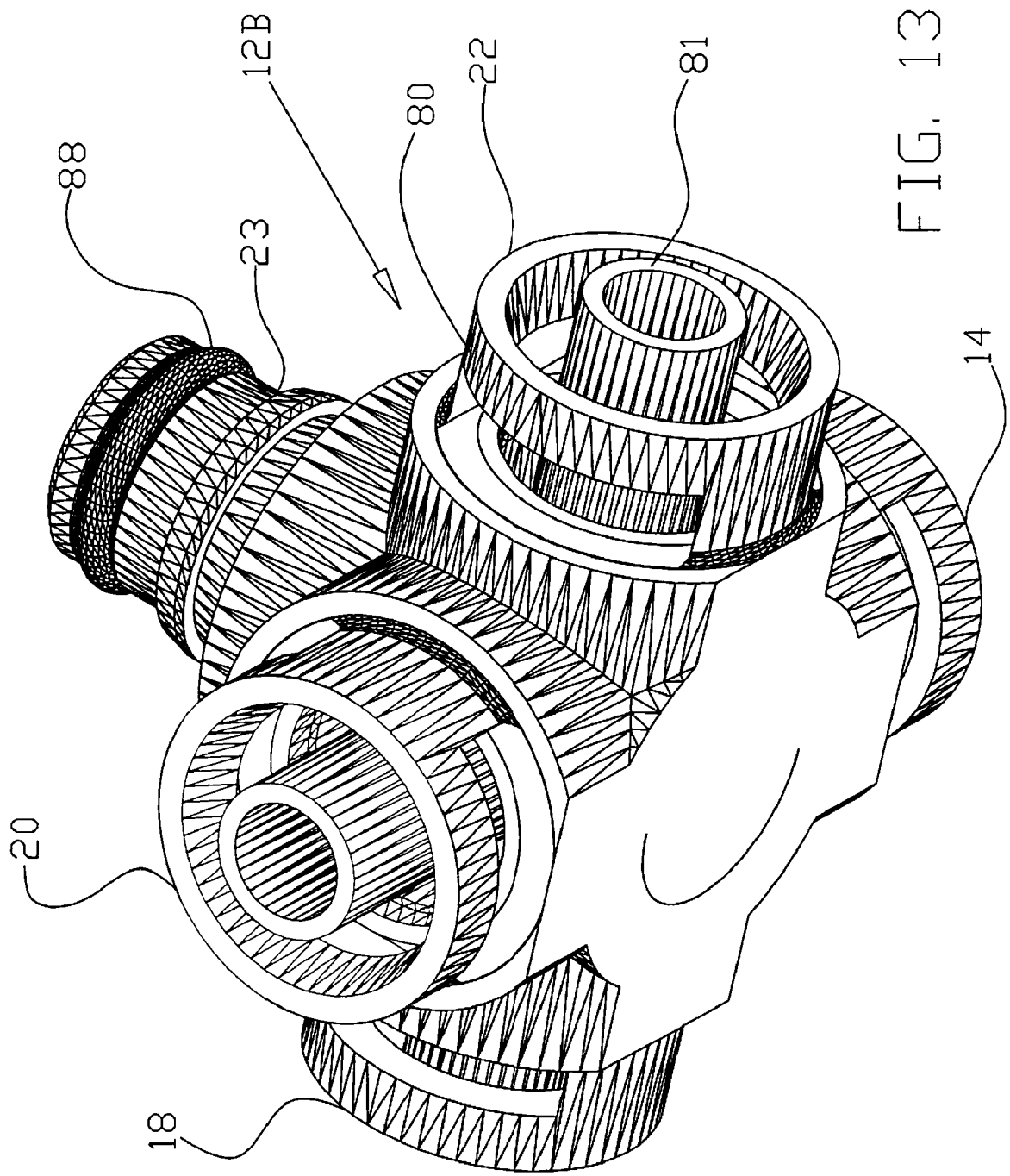
FIG. 13 is a three dimensional perspective view of a multiple port snap swivel coupling connector constructed in accordance with another embodiment of the present invention providing connection and expansion along a X axis, a Y axis and a Z axis, and in a X plane, a Y plane and a Z plane.
Figure 19:
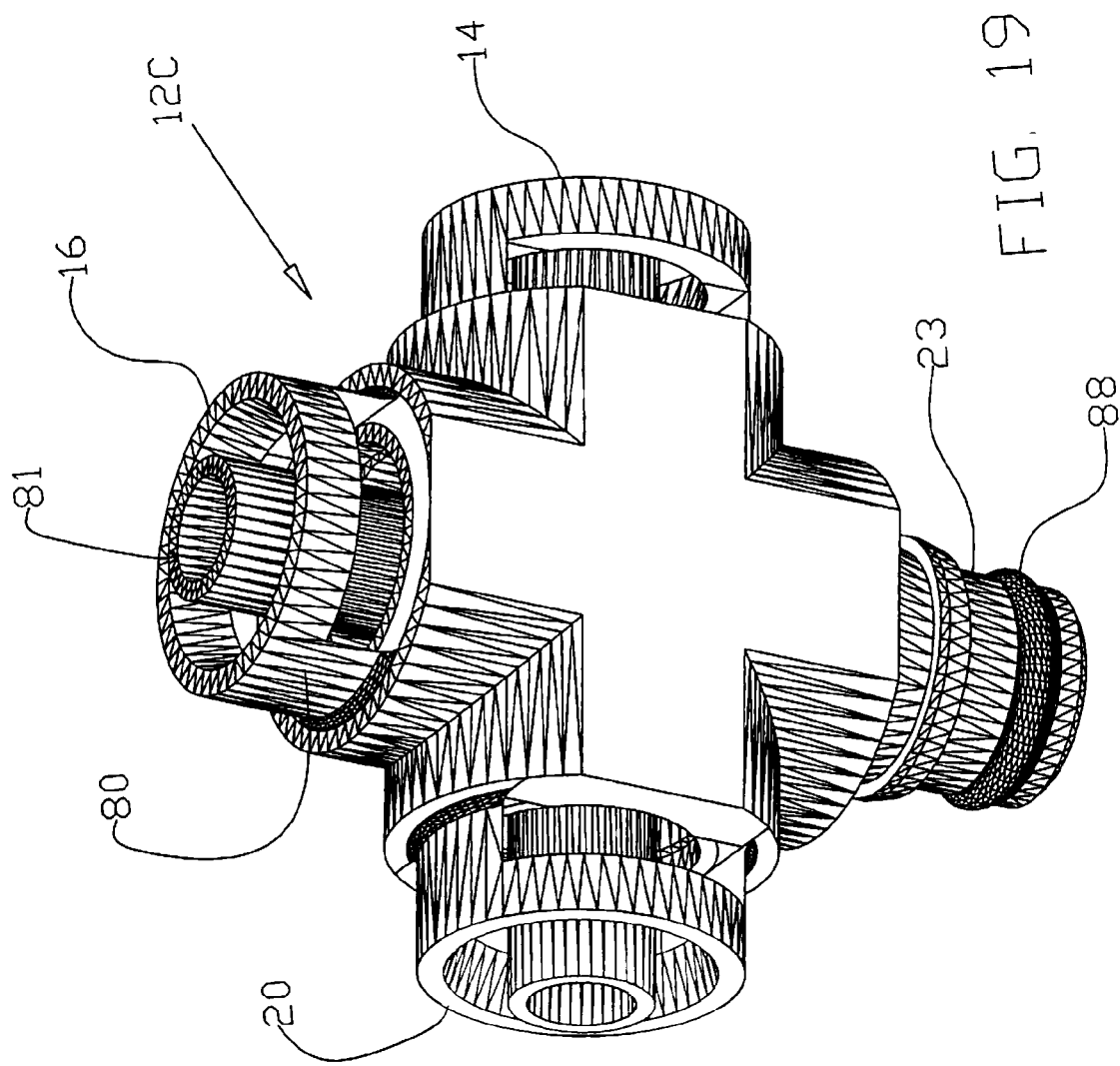
FIG. 19 is a three dimensional perspective view of a "+" multiple port snap swivel coupling connector constructed in accordance with another embodiment of the present invention providing connection and expansion along a X axis and a Y axis, and in a X plane and a Y plane.
Figure 29:
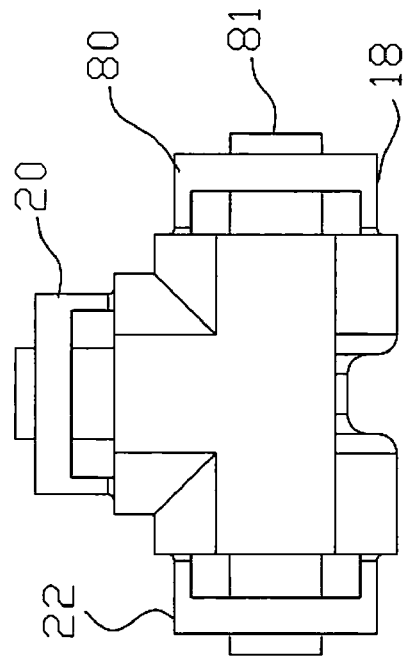
FIG. 29 is a top elevational view of the connector of FIG. 2S.
Figure 30:
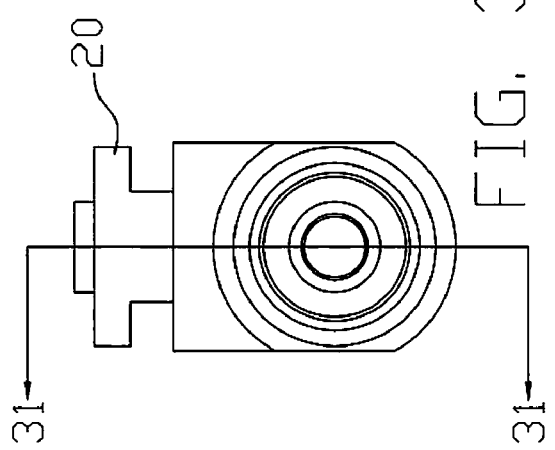
FIG. 30 is a side elevational view of the connector of FIG. 28.
Figure 31:
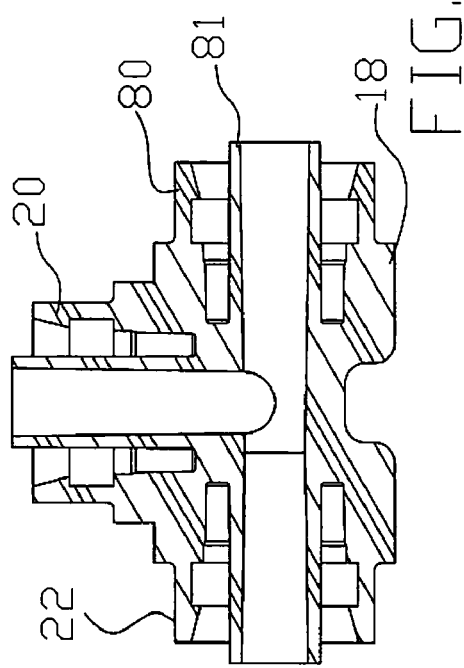
FIG. 31 is a vertical section take generally on line 31-31 of FIG. 30.
Figure 32:
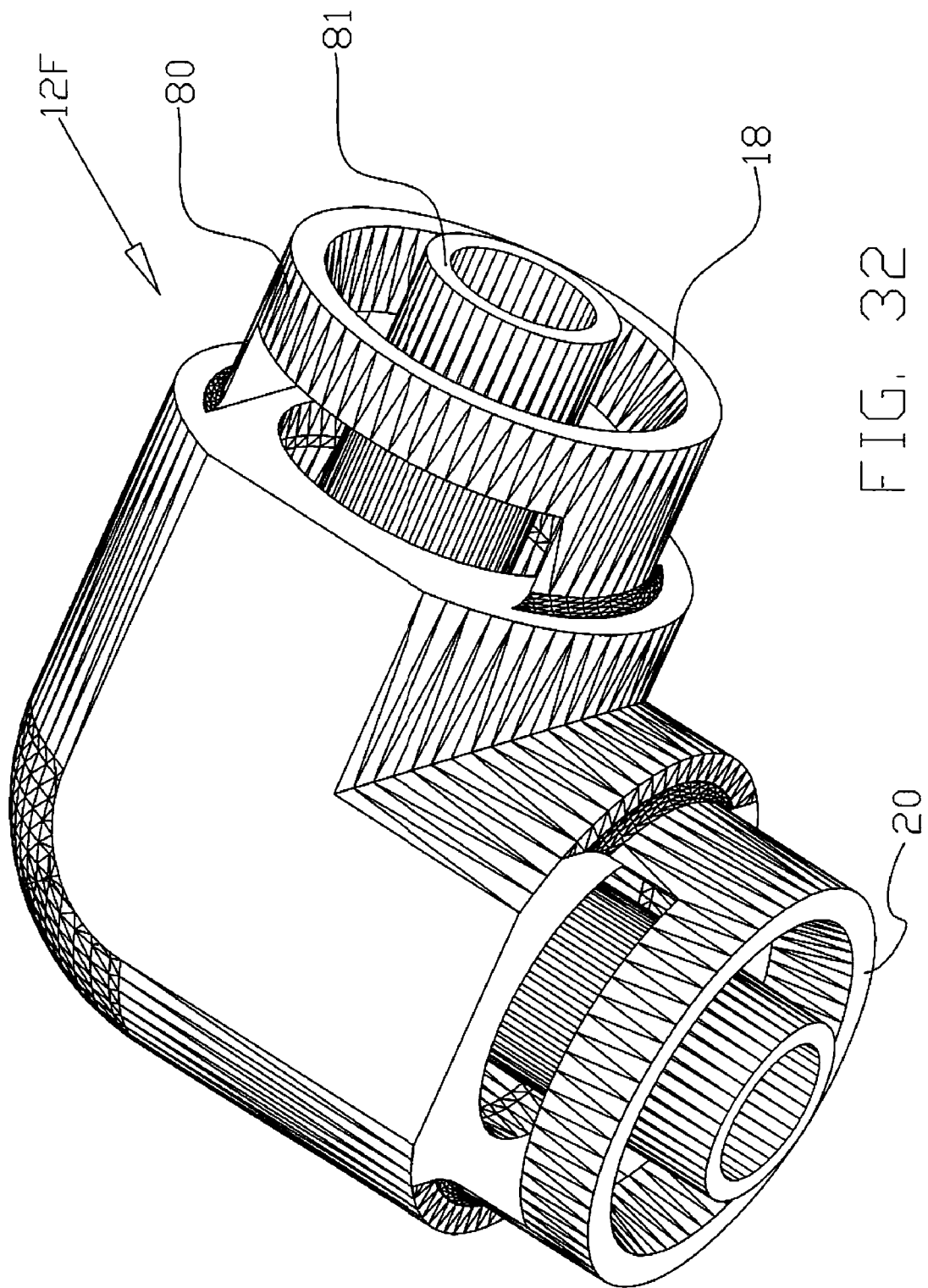
FIG. 32 is a three dimensional perspective view of a "L" multiple port snap swivel coupling connector constructed in accordance with another embodiment of the present invention providing connection and expansion in along a X axis and a Y axis, and in a X plane and a Y plane.
Figure 36:
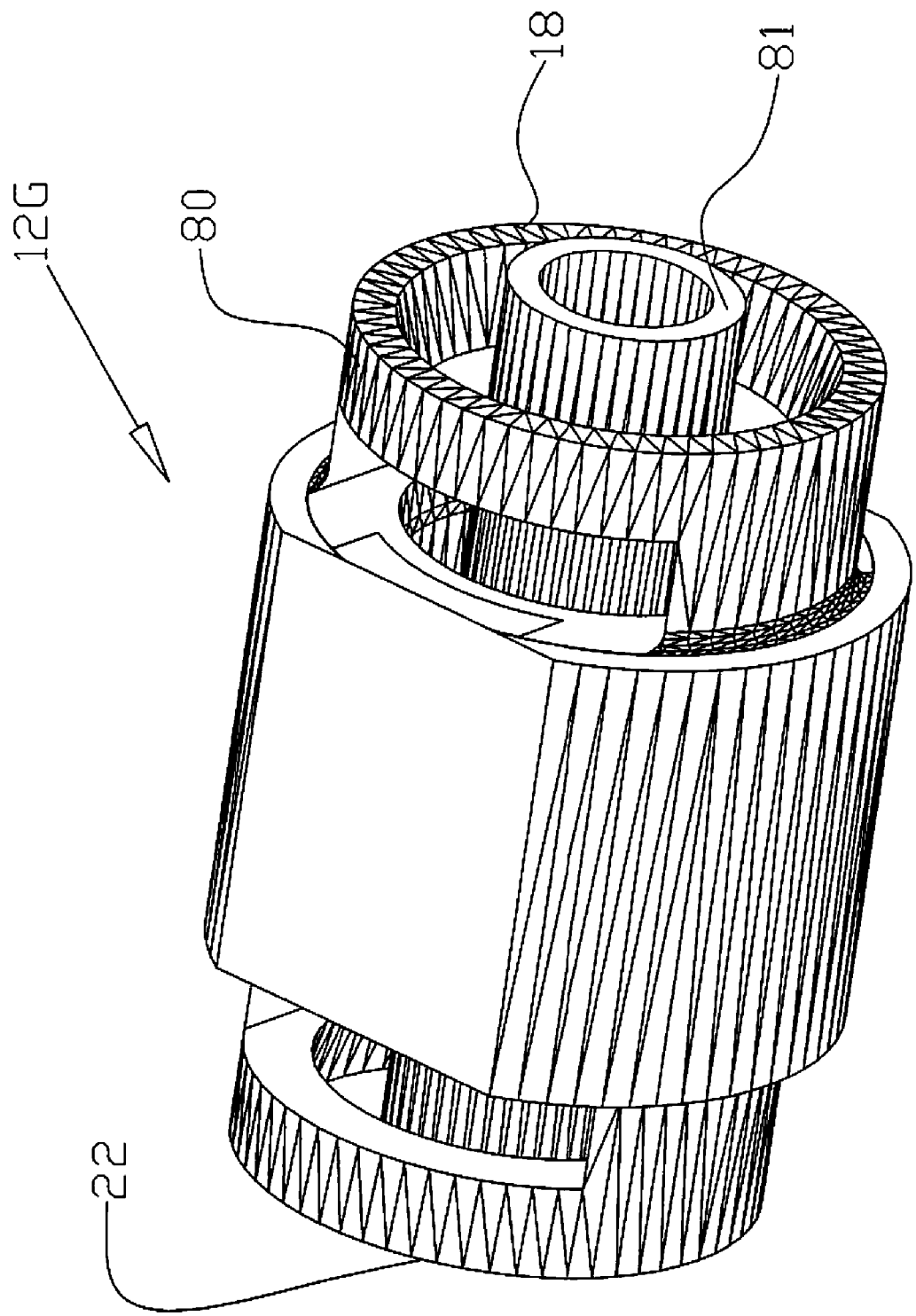
FIG. 36 is a three dimensional perspective view of an 'T' feed through multiple snap port swivel coupling connector constructed in accordance with another embodiment of the present invention providing connection and expansion along a X axis and in a X plane.

Referring to the drawing and particularly to FIGS. 1, 2 and 7, a multiple piece or multi-piece swivel coupling kit 10 includes a swivel coupling socket 12 having multiple sockets 14, 16, 18, 20, and 22 and a male tubular stem 23. Stem 23 is configured to connect to a source flow line or supply 24 through tubular stem member 26 which includes a formed outer surface such as hexagonal outer surface 28 and a threaded connection 30. Outer surface 28 is provided such that tubular stem member 26 may be manipulated by associated tooling and rotate freely when inserted and snapped into place on stem 23. Stem member 26 is configured such that a supply of fluid (air, liquid or the like) can be provided to threaded connection 30 and to the configured swivel coupling kit 10. As may be appreciated by those skilled in the art, each socket 14, 16, 18, 20 and 22 may each receive a tubular stem member of various configurations, as will be discussed in detail below, such that multiple sources of fluid may be supplied to kit 10 depending on the configuration and use of the kit.

Kit 10 includes multiple tubular stem members which may take on various configurations. Such configurations may include L-shaped stem members 32, 34, 36 and 38 each with a barbed connection end 40, 42, 44 and 46 in various sizes for attaching various sized flexible lines thereto (not shown). Kit 10 allows for conducting the supplied fluid through the multiple legs as configured by the user, including a supply from and to one or more locations. The coupling kit also may include a variety of tubular stem connectors each shaped for a particular use including straight connectors 48, 50 and 52. Straight connector 48, 50 and 52 may be also be provided in various sizes and include barbed end connections 54, 56 and 58 for attaching various sized flexible lines thereto (not shown). As shown in FIG. 2, kit 10 also includes a T-shaped stem member 60 to allow desired branches to be formed with kit 10 to provide desired configurations and routing of fluid and flexible fluid lines. T-shaped stem member includes barbed end connections 61 and 63. A plug or cap 62 is provided to allow one or more of tubular sockets 14, 16, 18, 20, 22 to be closed off such that fluid supplied will not escape and degrade operation of kit 10 for its intended use.

Multiple swivel sockets may be connected together or ganged along a X axis, a Y axis or a Z axis, or in a X plane, a Y plane or a Z plane to further expand and provide flexibility of kit 10 and its component parts. The multiple sockets may each be configured, connected together or ganged and rotated with respect to each stem member in any combination of X-Y, X-Z or Y-Z planes. It should be appreciated that "ganged" as used herein shall mean to arrange or assemble into a group, and may include simultaneous operation and acting together as a group. Tubular socket members 64, 65 and 66 are shown but it should be appreciated that there is no limit to the number of sockets or tubular stem members that may be connected together or ganged to expand and configure kit 10 for a particular purpose. As is shown in FIGS. 1 and 2, all tubular stem members illustrated are rotatable through a range of 360 degrees and can be positioned at any point on the 360 degree arc adding to the flexibility of kit 10 and its component parts.

As illustrated in FIGS. 1 and 2, tubular socket members 12, 64 and 66 include a male tubular stem member 23 which may be inserted or telescoped into a tubular socket member such as tubular socket members 12, 64, 65 or 66. Such telescoped connection may occur at any of the sockets such as sockets 14, 16, 18, 20, and 22 thereby providing flexibility in the configuration of kit 10.

As also shown in FIG. 2, a feed through or I-shaped tubular connector 68 may provide feed through of the supplied fluid and ability to connect multiple socket members or tubular stem members within kit 10. In addition, a T-shaped tubular stem connector 60 is provided adding flexibility to kit 10 and its components. Tubular stem members may be configured in a variety of shapes including but not limited to a nipple lobular stem member, a L-shaped tubular stem member, a T-shaped tubular stem member, a Y-shaped tubular stem member, a X-shaped tubular stem member, an l-shaped tubular stem member, a cap tubular stem member or the like as required for a specific kit configuration. Kit 10 achieves additional flexibility in having an I-shaped tubular stem member 68 which in the embodiment of FIGS. 2 and 3 includes two male ends 70 and 72. An I-shaped tubular stem member may also be configured with two female ends, or one female end and one male end, to provide further flexibility in the configuration, re-configuration and expansion capabilities of kit 10.

Each tubular shaped stem member 32, 34, 36, 38, 48, 50, 52, 60, 62 and 68 include stems 70, 72 and 74 which are constructed to telescope into one of the sockets in tubular socket members 12, 64, 65 or 66. Stems 70, 72 and 74 are connected in a close-lined engagement with one of the sockets.

Figure 3:
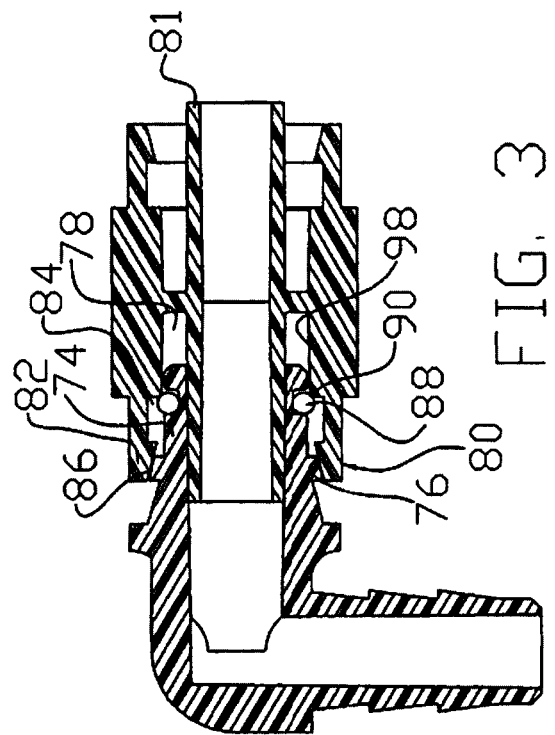
FIG. 3 is an enlarged longitudinal section of the prior designed snap lit connector showing assembly and scaling thereof.
Figure 4:
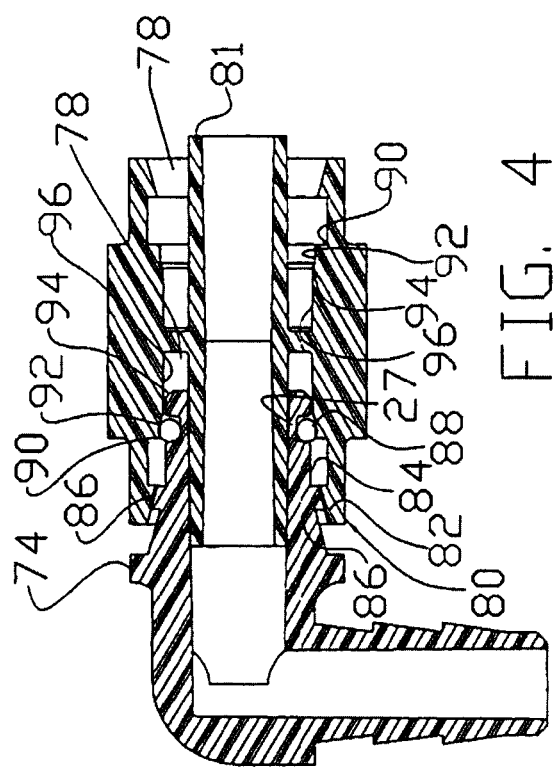
FIG. 4 is an enlarged longitudinal section of an improved snap swivel connector constructed in accordance with the leaching of the present invention providing improved assembly and sealing.

For ease in illustrating and describing the close fitted engagement, reference will be made to FIGS. 3 and 4. As shown in FIGS. 3 and 4 a tapered bearing unit 76 is constructed within the fitted stem and socket. The socket 78 is formed with an outer skirt 80 including an annular bearing projection 82 mating with a complementing cavity or recess 84 on stem 74 to form bearing unit 76. Projection 82 and recess 84 have complementing tapered or conical surfaces defining corresponding bearing surfaces. Inwardly of recess 84, an inclined projecting cam 86 is formed on stem 74 having an angle generally parallel to the base of the recess 84. The cam 86 rides on the inclined projection 82, deflecting the projection outwardly in the snap-action assembly. Such construction and snap-action is more fully described in U.S. Pat. No. 4,946,204 to the inventor herein. John Boticki. U.S. Pat. No. 4,946,204 is fully incorporated herein.

Stem 74 further projects inwardly of socket 78 and includes an O-ring seal 88 compressed against the opposed wall of socket 78 to form a fluid light connection thereby achieving the desired coupling. A center tube 81 is molded into socket 78 and projects coaxially from the base of socket 78. In the assembled coupling, tube 81 projects into stem 74. Tube 81 is a support tube which contributes to the overall rigidity and strength of the coupling. This is particularly significant in applications of small swivel couplings. Thus, a multiple port coupling having as many as 8 or more tubular snap swivel sockets, supporting connection and 360 rotation of multiple tubular stems has been formed with a total overall length on the order of one-half inch with a maximum exterior diameter of less than one quarter inch.

In assembly, as shown in FIG. 3, a design described in U.S. Pat. No. 4,946,204 includes O-ring seal 88 applied to stem 74 in annular recess 27 and the stem 74 is forced into socket 78. The cam 86 on stem 74 engages projection 82 and deflects the outer skin 80 of socket 78 outwardly until the projection 82 is aligned with recess 84. The projection 82 then snaps into the recess 84 and into close lilting engagement to establish a tensioned engagement at the bearing interface. Thus, projection 82 does not quite return to the unstressed state and establishes and maintains a smooth swivel rotational movement between the stems 74 and socket 78. The O-ring seal 88 creates the desired pressure light closure of the coupling as it passes edge 90, is pressed in between stem 74 and socket 78, and when stem 74 is snapped into place within socket 78 (projection 82 is aligned with recess 84 as described above).

As shown in FIG. 4, a preferred embodiment of the invention includes an improved O-ring scat which provides a lead path beyond edge 90 for easing the O-ring seal 88 into socket 78 as O-ring 88 is moved into position between stem 74 and socket 78. Specifically, an annular channel 92 is provided extending circumferentially around socket 78 positioned below edge 90. Channel 92 defines and includes a second edge 94 just below edge 90 for accepting and casing O-ring 88 past second edge 94. Accordingly, as O-ring 88 is moved into socket 78, the O-ring is first moved past edge 90 into channel 92. As stem 74 is further inserted into socket 78, O-ring 88 moves into engagement with second edge 94 and past second edge 94 engaging outside wall 96 of socket 78. When stem 74 is snapped into place within socket 78. O-ring 88 is positioned in a scaling relationship between wall 96 and tubular stem 74. Construction in this manner, using multiple step compression of O-ring 88, reduces the shear force imposed on O-ring 88 as stem 74 is installed into socket 78. This allows for in-the-field connection and expansion of fluid systems utilizing the embodiments of the multiple port or multi-port snap swivel connectors and kits disclosed herein.

As can be seen in FIG. 4, this two step movement of O-ring 88 into socket 78 as stem 74 is inserted into socket 78 provides a seat for O-ring 88 into which O-ring 88 is eased during assembly of the coupling. This improved edge design may be used to enhance the ease of fitment and configuration of each tubular stem member with the sockets as described herein without affecting the integrity or sealing accomplished by O-ring 88 upon snap fitment of the coupling as described herein. In the alternative, edge 90 may be angled such that a specific edge is not formed. Instead a ramp from edge 90 which defines a tapered channel 92 may be provided to preform the easing and guiding function thereby reducing the pressure and shear force exerted on O-ring 88 at edge 90. It should be appreciated that a variety of configurations of socket 78 are possible and contemplated herein to accomplish easing and reducing of the shear force which occurs on O-ring 88 when it is installed into socket 78 and channel 92. Such configurations include, but are not limited to, multiple stepped interior socket walls, multiple angled edges within the socket walls, one or more eased edges and similar configurations which reduce the shear force applied to O-ring 8S when it is installed into its sealing position.

Any suitable material may be used in forming of the coupling, including the tubular socket member and the tubular stem members. A tough, abrasive resistance molding plastic is preferable and may include moldable plastic resins and the like. A general purpose plastic such as Celanese Nylon 1000-2, manufactured and sold by Celanse Corporation of 1211 Avenue of the Americas, New York, N.Y., 10036, has been found to provide a particularly satisfactory product. The material is a general purpose and heat-stabilized injection molding grade 6/6 type plastic resin. The material has a high strength and toughness as well as being resistant to abrasion and chemical attack.

Figure 5:
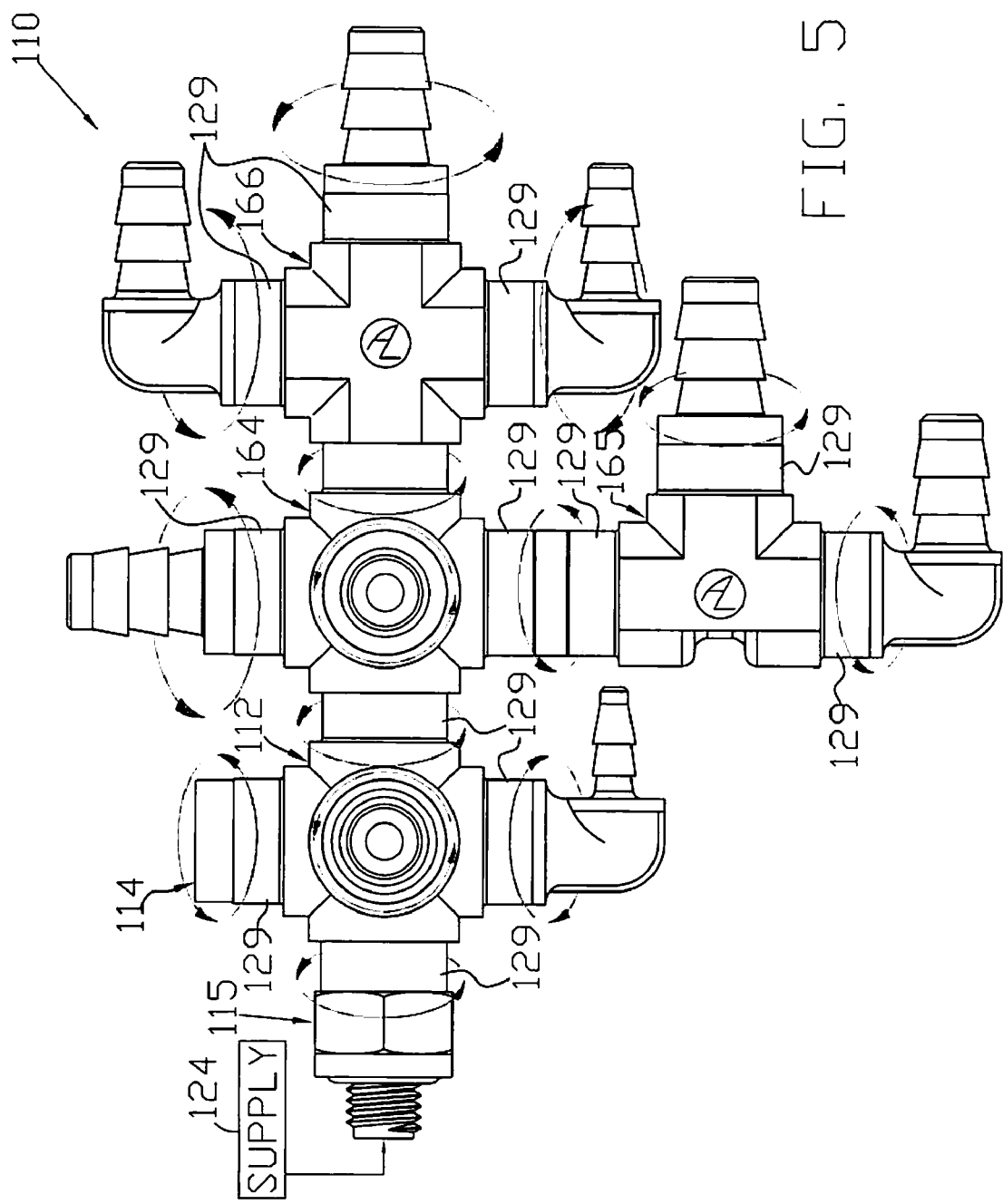
FIG. 5 is a top elevational view of a second embodiment of the multi-piece snap swivel coupling kit constructed in accordance with the teaching of the present invention.
Figure 6:
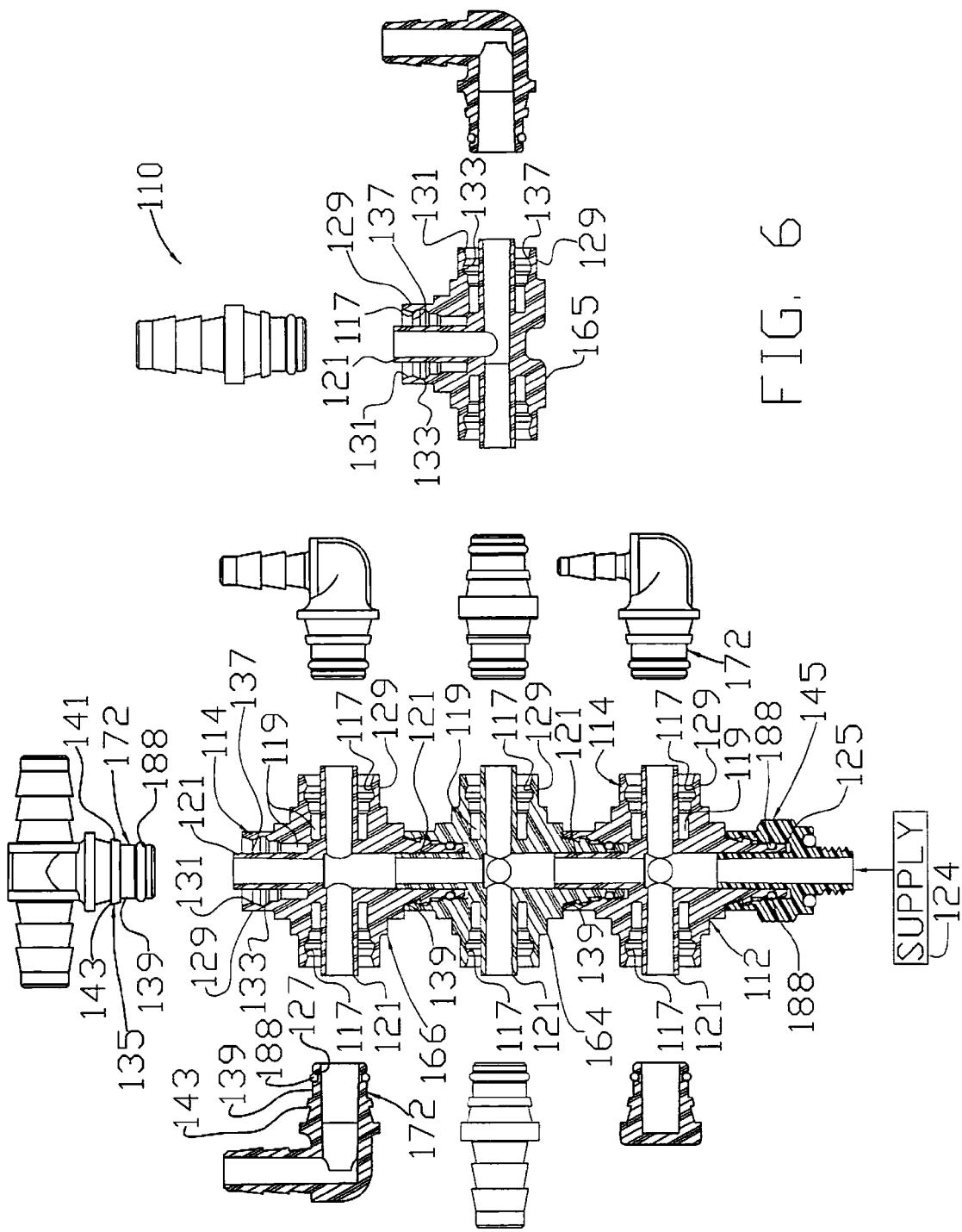
FIG. 6 is an exploded, partial sectional, of a multi-piece snap swivel coupling kit similar to the kit shown in FIG. 5.

Referring to FIGS. 5 and 6, a multi-piece swivel coupling kit 110 is illustrated having the same components, general structure and function as in FIGS. 1 and 2 (described above). The embodiment illustrated in FIGS. 5 and 6 includes an uninterrupted and continuous bearing surface 117 which provides releasable connection of each socket member and each stem member, and 360 degree rotation of each stem member when installed in a corresponding socket member. As shown in FIG. 5, the annular skirt illustrated in FIG. 1 has been replaced with a solid wall socket including annular recesses which form a releasable snap fit connection. Such releasable snap fit connection provides for later re-configuration and expandability of the system constructed using kit 110.

More particularly, in the illustrated embodiment of FIG. 5, multiple tubular sockets 114 are provided in tubular sockets members 112, 164, 165 and 166. A center lube 121 is molded into the tubular sockets members 112, 164, 165 and 166 and projects coaxially from the connector and body portion, and particularly from the socket base outwardly of tubular sockets 114 to define an annular chamber 119 within the socket. In the assembled coupling, the center tube 121 projects into stem 172, which correspondingly projects into annular chamber 119 with slight gaps 125 at the radial interface therebetween. Center tube 121 is a support tube which contributes to the overall rigidity and strength of the coupling. The inner end of the annual chamber 119 and the stem 172 are generally cylindrical with the O-ring seal 188 located within an annular recess 127 in the stem 172. The O-ring seals 188 project from recess 127 between the exterior wall of the stem 172 and the opposed wall of the annular chamber 119 to seal the coupling.

An uninterrupted annular wall 129 is formed above annular chamber 119. Channels 131 and 133 are formed within annular wall 129 defining recesses which accommodate projection 135 in stem 172 in the fully assembled state of the coupling. Annular wall 129 connected to the annular chamber body establishes firm, reliable support of the wall and bearing projections 137 while permitting the necessary slight movement of the bearing projection 137 into the annular recess 139 of the stem 172.

Stem 172 is a tubular member with the inner end formed as a substantial cylinder located within the inner end of the socket chamber 119. O-ring seal recess 127 is provided within the cylinder and has a depth slightly less than the diameter of the O-ring seal 18S. The projection of O-ring seal 188 spans the gap 125 to the socket wall and seals the interlace with a sliding fit as described herein. A supply fitting 145 is provided to connect supply 124 to kit 110. Supply fitting 145 includes an O-ring 188 set in a channel 127 similar to that herein described for kit 10. The socket body immediately above the O-ring seal unit is a substantial body portion, the exterior may be formed with a configured outer surface 115 to receive a suitable tool (not shown) for tightening of the threaded joint between the coupling and the flow line from supply 124.

Cam 141 on stem 172 is located in alignment with recess 139 in the assembled state. The outer end of the inclined cam 141 has cylindrical surface 143 of a diameter slightly less than the base of the recess 139. The surface 143 is therefore spaced from the base of recess 139. This allows the annular wall 129 to deflect with bearing wall 129 of projection 137 into pressure engagement with the base wall of the bearing recess 139 on stem 172.

Annular wall 129 in combination with projections 133 and 137 on the tubular socket members are coextensive with stem 172 in combination with cam 141, recess 139 and surface 143 in supporting the tubular stem members for rotation with respect to the tubular socket members. Such coextensive support allows for the releasable pressure engagement and rotational rigidity of tubular stem member within the sockets of the tubular socket members. 360 degree rotation is achieved with the ability to position the tubular socket member at any point along the 360 degree rotational arc.

Snap swivel coupling kits 10, 110 include multiple tubular socket members which may be configured or connected together in the manner described herein to further expand and provide flexibility of the illustrated embodiments. Tubular socket members 12, 64, 65, 66, 112, 164, 165 and 166 are shown in the preferred embodiments, but it should be appreciated that there is no limit to the number of sockets or tubular stem members that may be connected together to expand, configure and re-configure kits 10, 110 for a particular purpose. Such lobular socket members may be configured, expanded, re-configured and constructed in many ways and in unlimited permutations. Nothing herein should be taken as limiting the configurations that may be attained by the swivel snap coupling kits and tubular socket members herein.

As illustrated in FIGS. 7-12, a tubular socket member 12 having multiple socket members is illustrated. Tubular socket member 12 includes socket members for expansion along a X axis, a Y axis and a Z axis and in a X plane, a Y plane and a Z plane. Tubular socket member 12 also includes stem member 23 which provides for additional configuration, expansion and re-configuration options for a swivel coupling kit such as kit 10 of FIG. 1 or swivel coupling kit 110 of FIG. 5. Details and alternate configurations consistent with those shown in FIGS. 1-6 are illustrated and contemplated relating to and in conjunction with the construction and use of the multiple port snap swivel coupling of FIGS. 7-12. As can be seen sockets 14, 16, 18, 20 and 22 provide the flexibility and versatility to configure kits 10 and 110 as necessary for any particular configuration and in all possible planes. Stem member 23 includes annular recess 27. O-ring 88 is located within annular recess 27 and projects therefrom to provide sealing of the socket member and stem member connection as described herein. O-ring seal 88 provides the sealing for stem member 23 when inserted into a socket in conjunction with outer skirt 80 and center tube 81 as described herein. It may be appreciated that, based on the type of connection desired, each socket member 14, 16, 18, 20 and 22 may in the alternative include annular wall 129 and center tube 121 as also described herein in conjunction with FIGS. 5 and 6 or a combination of an outer skirl 80 on one or more socket members and an annular wall 129 on an one or more socket members.

As illustrated in FIGS. 13-18, a tubular socket member 121J having multiple socket members is illustrated. Tubular socket member 12B includes socket members for expansion along a X axis, a Y axis and a Z axis and in a X plane, a Y plane and a Z plane. Tubular socket member 12B also includes stem member 23 which provides for additional configuration, expansion and re-configuration options for a swivel coupling kit such as kit 10 of FIG. 1 or swivel coupling kit 110 of FIG. 5. Details and alternate configurations consistent with those shown in FIGS. 1-6 are illustrated and contemplated relating to and in conjunction with the construction and use of the multiple port snap swivel coupling of FIGS. 13-18.

As can be seen sockets 14, 18, 20 and 22 provide the flexibility and versatility to configure kits 10 and 110 as necessary for any particular configuration and in the X. Y and Z planes. Stem member 23 includes annular recess 27. O-ring 88 is located within annular recess 27 and projects therefrom to provide sealing of the socket member and stem member connection as described herein. O-ring seal 88 provides the sealing for stem member 23 when inserted into a socket in conjunction with outer skirt 80 and center lube 81 as described herein. It may be appreciated that, based on the type of connection desired, each socket member 14, 18, 20 and 22 may in the alternative include annular wall 129 and center tube 121 as also described herein in conjunction with FIGS. 5 and 6 or a combination of an outer skirl 80 on one or more socket members and an annular wall 129 on an one or more socket members.

As illustrated in FIGS. 19-23, a tubular socket member 12C having multiple socket members is illustrated. Tubular socket member 12C includes socket members for expansion along a X axis and a Y axis, and in a X plane and a Y plane, and can be seen to have a configuration of a "+." Tubular socket member 12C also includes stem member 23 which provides for additional configuration, expansion and re-configuration options for a swivel coupling kit such as kit 10 of FIG. 1 or swivel coupling kit 110 of FIG. 5. Details and alternate configurations consistent with those shown in FIGS. 1-6 are illustrated and contemplated relating to and in conjunction with the construction and use of the multiple port snap swivel coupling of FIGS. 19-23.

As can be seen sockets 14, 16 and 20 provide the flexibility and versatility to configure kits 10 and 110 as necessary for any particular configuration and in the X and Y planes. Each socket member 14, 16 and 20 includes an outer skirt 80 and a center tube 81 as described herein for telescopic engagement with a stem member as also described herein. Stem member 23 includes annular recess 27. O-ring 88 is located within annular recess 27 and projects therefrom to provide sealing of the socket member and stem member connection as described herein. O-ring seal 88 provides the scaling for stem member 23 when inserted into a socket in conjunction with outer skin 80 and center tube 81 as described herein. It may be appreciated that, based on the type of connection desired, each socket member 14, 16 and 20 may in the alternative include annular wall 129 and center lube 121 as also described herein in conjunction with FIGS. 5 and 6 or a combination of an outer skirl 80 on one or more socket members and an annular wall 129 on an one or more socket members.

As illustrated in FIGS. 24-27, a tubular socket member 12D having multiple socket members is illustrated. Tubular socket member 12D includes socket members for expansion along a X axis and a Y axis, and in a X plane and a Y plane and can be seen to have a configuration of a "+." Details and alternate configurations consistent with those shown in FIGS. 1-6 are illustrated and contemplated relating to and in conjunction with the construction and use of the multiple port snap swivel coupling of FIGS. 24-27. As can be seen sockets 14, 18, 20 and 22 provide the flexibility and versatility to configure kits 10 and 110 as necessary for any particular configuration and in the X and Y planes. Each socket member 14, 18, 20 and 22 includes an outer skirt 80 and a center tube 81 as described herein for telescopic engagement with a stem member as also described herein. It may be appreciated that, based on the type of connection desired, each socket member 14, 18, 20 and 22 may in the alternative include annular wall 129 and center tube 121 as also described herein in conjunction with FIGS. 5 and 6 or a combination of an outer skirl 80 on one or more socket members and an annular wall 129 on an one or more socket members.

As illustrated in FIGS. 28-31, a tubular socket member 12E having multiple socket members is illustrated. Tubular socket member 12E includes socket members for expansion along a X axis and a Y axis, and in a X plane and a Y plane and can be seen to have a configuration of a "T." Details and alternate configurations consistent with those shown in FIGS. 1-6 are illustrated and contemplated relating to and in conjunction with the construction and use of the multiple port snap swivel coupling of FIGS. 28-31. As can be seen sockets 1S. 20 and 22 provide the flexibility and versatility to configure kits 10 and 110 as necessary for any particular configuration and in the X and Y planes. Each socket member 18, 20 and 22 includes an outer skirt 80 and a center tube 81 as described herein for telescopic engagement with a stem member as also described herein. It may be appreciated that, based on the type of connection desired, each socket member IS. 20 and 22 may in the alternative include annular wall 129 and center tube 121 as also described herein in conjunction with FIGS. 5 and 6 or a combination of an outer skirl 80 on one or more socket members and an annular wall 129 on an one or more socket members.

As illustrated in FIGS. 32-35, a tubular socket member 12F having multiple socket members is illustrated. Tubular socket member 12F includes socket members for expansion along a X axis and a Y axis, and in a X plane and a Y plane and can be seen to have a configuration of a "L." Details and alternate configurations consistent with those shown in FIGS. 1-6 are illustrated and contemplated relating to and in conjunction with the construction and use of the multiple port snap swivel coupling of FIGS. 32-35. As can be seen sockets 18 and 20 provide the flexibility and versatility to configure kits 10 and 110 as necessary for any particular configuration and in the X and Y planes. Each socket member 18 and 20 includes an outer skin 80 and a center tube SI as described herein for telescopic engagement with a stem member as also described herein. It may be appreciated that, based on the type of connection desired, each socket member 18 and 20 may in the alternative include annular wall 129 and center lube 121 as also described herein in conjunction with FIGS. 5 and 6 or a combination of an outer skirl 80 on one or more socket members and an annular wall 129 on one or more socket members.

As illustrated in FIGS. 36-39, a tubular socket member 12G having multiple socket members is illustrated. Tubular socket member 12G includes socket members for expansion along a X axis and in a X plane, and can be seen 10 have a configuration of an "I." Details and alternate configurations consistent with those shown in FIGS. 1-6 are illustrated and contemplated relating to and in conjunction with the construction and use of the multiple port snap swivel coupling of FIGS. 36-39. As can be seen sockets 18 and 20 provide the flexibility and versatility to configure kits 10 and 110 as necessary for any particular configuration and in the X plane. Each socket member 18 and 20 includes an outer skirt 80 and a center lube 81 as described herein for telescopic engagement with a stem member as also described herein. It may be appreciated that, based on the type of connection desired, each socket member 18 and 20 may in the alternative include annular wall 129 and center tube 121 as also described herein in conjunction with FIGS. 5 and 6 or a combination of an outer skirl 80 on one or more socket members and an annular wall 129 on one or more socket members.

FIGS. 40-45 illustrate three preferred embodiments of a mounting and holding clip mechanism for mounting swivel coupling kits 10, 110 on various base members (not illustrated). Such base members may include a vertical wall, a cabinet, a vertical or horizontal mounting platform or any other base member for holding one or more of the multi-port snap swivel couplings or flexible lines associated therewith.

As shown in FIGS. 40-43, a clip 200 includes a base 202 and a semi-circular "C" clip member 204 mounted to base 202 for holding and mounting multi-port snap swivel coupling 206. The clip member may be constructed of various polymers, plastics or resins with the desirable feature of being flexible such that the mounted multi-port snap swivel coupling or flexible line can be mounted to removed from and re-mounted to clip 200. It should be appreciated that any of the various snap swivel couplings disclosed herein can be mounted to one or more clips 200. Universal mounting in this manner allows the components of kits 10, 110 to be attached to and supported by any surface as required by a specific installation.

Figure 44:
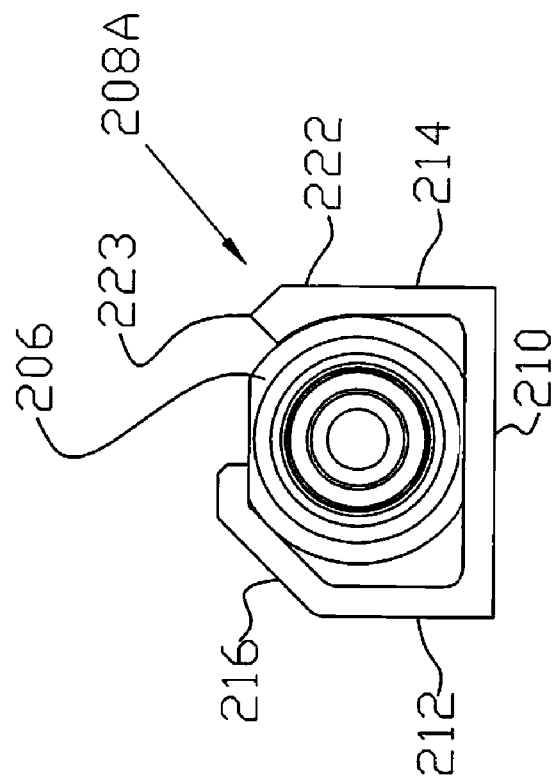
FIG. 44 is a side elevational view of a second embodiment of a clip for holding the snap swivel coupling connectors of the present invention.
Figure 45:
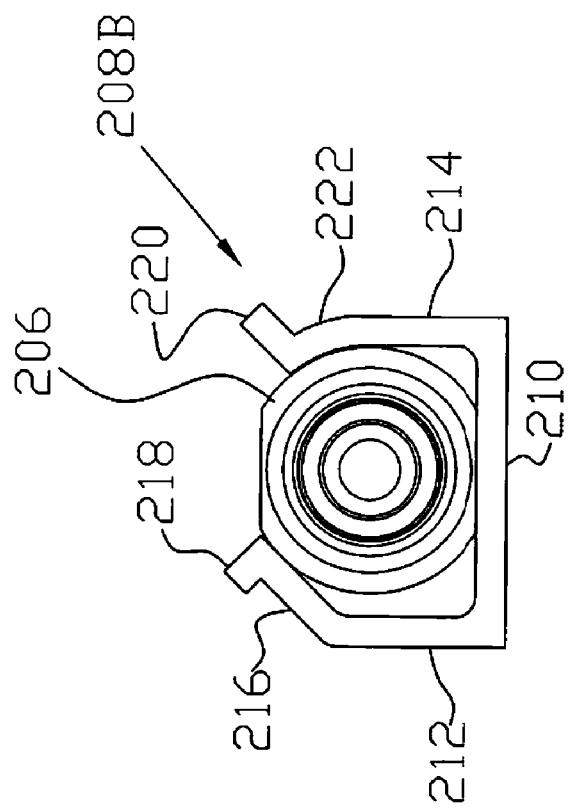
FIG. 45 is a side elevational view of a third embodiment of a clip for holding the snap swivel coupling connectors of the present invention.

FIGS. 44 and 45 illustrate additional preferred embodiments of a mounting clip mechanism. Specifically, clip 208A and 208B include a base 210 and two arms 212, 214. Arm 212 includes an angled portion 216. FIG. 45 illustrates clip 208B including angled portion 216 with release lab 218. Clip 208B also includes arm 214 having release tab 220 at the end thereof. One or both of the arms may include a radius portion 222 for more securely holding a multi-port swivel coupling. In addition, one or both arms may include a release tab or other release member for quickly and reliably-releasing the multi-port swivel coupling from its mounting. In the alternative, as illustrated in FIG. 44, clip 208A includes a top portion 223 of arm 214 for securing one side of a multi-port snap swivel coupling, such as multi-port snap swivel coupling 206.

FIGS. 46-49 illustrate nipple connector 224 used to mount and secure a flexible line to a mounting structure by feeding the connector 224 through a bulkhead, wall, mounting block or other vertical structure. Nipple connector 224 includes a threaded body member 226 for insertion through a bulkhead or the like. Nipple connector 224 includes a tubular socket member 228 al one end and a barbed end 230 at the other. The connector 224 may also include a hex head 232 or other fastener-like head portion for engaging the tubular socket member for installation in or removal from the bulkhead mounting or the system. Tubular socket member 228 includes an outer skirt 80 and a center lube 81 as described herein for telescopic engagement with a stem member as also described herein.

As illustrated, nipple connector 224 is configured with a non-releasable tubular socket member as used in kit 10 illustrated in FIGS. 1-2. It may be appreciated that oilier tubular socket member configurations may be use, including the releasable configuration of kit 110 as described above with respect to FIGS. 5 and 6. Such a configuration is illustrated in FIGS. 50-53 with the same element numbers as in FIGS. 46-49 but with a "B" designation. Specifically, nipple connector 224B includes a threaded body member 226B for insertion through a bulkhead or the like. Nipple connector 224B includes a tubular socket member 228B at one end and a barbed end 230B at the other end. The connector 224B may also include a hex head 232B or other fastener-like head portion for engaging the tubular socket member for installation in or removal from the bulkhead mounting or the system. Tubular socket member 228B includes annular wall 129 with continuous bearing surface 117 and center tube 121 to provide the releasable configuration of nipple connector 224B as described and illustrated herein.

FIGS. 54-56 illustrate a feed-through connector 234 showing a tubular socket member having the previously described eased non-releasable snap swivel connection 236 at both ends. Feed through connector 234 includes an outer skirl 236 and a center tube 237 to provide the 360 degree rotatable snap swivel connection as described herein. Feed-through connector 234 also includes a threaded body 238 which allows mounting through a bulkhead, wall or other vertical surface. The connector 234 may also include a hex head 240 or other fastener-like head portion for engaging the tubular socket member for installation in or removal from the bulkhead mounting or the system. FIGS. 57 and 58 illustrate a threaded nut 242 for use in securing any of the feed through connectors illustrated in FIGS. 46-56 to or through a bulkhead, wall or other vertical surface. Threaded nut 242 includes a formed outer surface such as positioned flat surface 244. It may be appreciated that a variety of formed surfaces can be used which generally allow for engagement by a tool or for hand threading.

The coupling members illustrated and described herein are formed of a suitable plastic material to establish a low friction sliding force while creating a stable coupling position. The illustrated swivel coupling kit and multi-port snap swivel coupling provide 360 degree rotation of the main flowing connecting members; the stem members and the tubular socket members. The stem and socket may be formed of a basic design with the threaded end formed with any industry standard thread size such as UNC or UNF thread sizes including #0 though #12 and $\frac{1}{16}$" thought 4" and the like, as necessary for a particular application.

All threaded plastic members described herein are readily designed to fit a complementing thread in various materials including plastic, steel, brass, aluminum and other available materials. The barbed end of the swivel coupling may be any size. Common sizes to lit $\frac{1}{16}$, $\frac{3}{32}$, $\frac{1}{8}$ and 0.170 inch flexible internal diameter tubing are contemplated. Other configurations and sizes can, of course, be formed including smaller sizes. For convenience, universal fitment and adjustment, a $\frac{1}{4}$ inch hex head is conveniently provided for the $\frac{1}{16}$ inch coupling and a $\frac{5}{16}$ inch hexhead for other sizes.

While the principles of the invention have been shown and described in connection with specific embodiments, it is to be understood that such embodiments are by way of example and are not limiting in any manner.

The invention claimed is:
1. A swivel coupling kit comprising a tubular socket member having a line connecting end and multiple coupling ends, multiple tubular stem members each having a line connecting end and a coupling end connectable to one of the coupling ends of the tubular socket member, said multiple coupling ends including integral complementing annular projection and recess portions defining a close fitting bearing unit creating forced engagement therebetween in a X plane, a Y plane or a Z plane to establish smooth rotational support of the socket member and each of the stem members in any combination of X-Y plane, X-Z plane or Y-Z plane.

2. The swivel coupling kit of claim 1 including a second tubular socket member, wherein the multiple coupling ends of the tubular socket members are configured to provide ganging of the two tubular socket members.

3. The swivel coupling kit of claim 1 wherein the multiple tubular stem members are releasably connectable to one of the coupling ends of the tubular socket member.

4. The swivel coupling kit of claim 1 including multiple tubular socket members which are adapted for being ganged together.

5. The swivel coupling kit of claim 1 including one or more of the following:
a nipple tubular stem member;
a "L" shaped tubular stem member;
a "T" shaped tubular stem member;
"+" shaped tubular stem member;
a "Y" shaped tubular stem member;
a "X" shaped tubular stem member;
a cap member;
a "L" shaped tubular socket member;
a "T" shaped tubular socket member;
a "+" shaped tubular socket member;
a "Y" shaped tubular socket member;
a "X" shaped tubular socket member;
a feed through tubular connector with two male ends;
a feed through tubular connector with two female ends; and
a feed through tubular connector having a male end and a female end.

6. The swivel coupling kit of claim 1 wherein the multiple tubular stem members include an outer surface adapted to be connected to a mounting structure.

7. The swivel coupling kit of claim 6 wherein the multiple tubular stem members include a threaded outer surface positioned to be mounted through the mounting structure.

8. The swivel coupling kit of claim 1 including a clip member adapted to be mounted to a mounting structure for holding at least one of the tubular socket member and the multiple tubular stem members.

9. The swivel coupling kit of claim 1 wherein the tubular socket member and the multiple tubular stem members are formed of a high strength and durable plastic which is abrasion resistant and resistant to chemical interaction.

10. The swivel coupling kit of claim 1 wherein the multiple coupling ends of the tubular socket member each include a cantilevered continuous annular skirt including the complementing portion of the projection and recess portions and the multiple coupling ends of the tubular socket member each having circumferentially spaced openings adjacent the projection and recess portions to permit deflection thereof during connection of the annular skirt of the tubular socket member with one of the tubular stem members.

11. The swivel coupling kit of claim 10 wherein the continuous annular skirt includes peripheral annular bearing surfaces which are inclined at a shallow angle from a constant diameter cylinder plane having an axis coincident with the axis of the multiple tubular stem members and the multiple tubular stem members including the recess portion having a cam surface parallel to the continuous peripheral annular bearing surfaces and adjacent the longitudinal end of the recess and engaging the projection portion during connection of the tubular socket member with one of the tubular stem members to deflect the projection portion.

12. The swivel coupling kit of claim 11 wherein the tubular stem member is telescopically connected to the tubular socket member and the shallow angle is approximately fifteen degrees.

13. The swivel coupling kit of claim 1 wherein the integral complementing annular projection and recess portions provide releasable connection of the socket member and each of the stem members.

14. The swivel coupling kit of claim 13 wherein the releasable connection of the socket member and each of the stem members allows reconfiguration of the socket member and each of the stem members.

15. The swivel coupling kit of claim 1 including a separate seal unit located between each of the stem members and the multiple coupling ends of the tubular socket member, the multiple coupling ends of the tubular socket member each including an inner support tube member extended into each of the stem members, and the seal unit located between an outer side of the stem members and the adjacent coupling end of the socket member.

16. The swivel coupling kit of claim 1 including a cylindrical mating chamber in each of the multiple coupling ends of the tubular socket member and a projecting wall in each of the stem members, said cylindrical mating chamber having a tubular wall projecting upwardly through each of the multiple coupling ends located in close spaced relation to each of the stem members.

17. The swivel coupling kit of claim 1 including a pressure seal unit between each socket member and the stem member, wherein integral complementing annular projection and recess portions of the multiple coupling ends of the socket member includes a first annular receiving recess and a second annular receiving recess, the first annular receiving recess having a diameter larger than the second annular receiving recess, such that as the stem member connects to one of the socket members, the pressure seal unit moves past the first annular recess then moves into the second annular recess.

18. A swivel coupling kit comprising a tubular socket member having a line connecting end and multiple coupling ends, multiple tubular stem members each having a line connecting end and a coupling end connectable to one of the coupling ends of the tubular socket member with a pressure seal unit therebetween, said multiple coupling ends including integral complementing annular projection and recess portions, said recess portions including a first annular receiving recess and a second annular receiving recess, the first annular receiving recess having a diameter larger than the second annular receiving recess, such that as the stem member connects to one of the socket members, the pressure seal unit moves past the first annular recess then moves into the second annular recess defining a close fitting bearing unit creating forced sealed engagement therebetween without external clamping to establish smooth rotational support of the socket member and each of the stem members.

19. A swivel coupling kit comprising two tubular socket members each having a line connecting end and multiple coupling ends, multiple tubular stem members each having a line connecting end and a coupling end connectable to one of the coupling ends of the tubular socket members, said multiple coupling ends including integral complementing annular projection and recess portions defining a close fitting bearing unit creating forced engagement therebetween to establish smooth rotational support of the socket members and each of the stem members, the multiple coupling ends of the tubular socket members being configured to provide ganging of the two tubular socket members.

20. A swivel coupling kit comprising multiple tubular socket members adapted for being ganged together, each tubular socket member having a line connecting end and multiple coupling ends, multiple tubular stem members each having a line connecting end and a coupling end connectable to one of the coupling ends of the tubular socket member, said multiple coupling ends including integral complementing annular projection and recess portions defining a close fitting bearing unit creating forced engagement therebetween to establish smooth rotational support of the socket member and each of the stem members.

* * * * *